US011884531B2

(12) United States Patent
Kudirka

(10) Patent No.: US 11,884,531 B2
(45) Date of Patent: Jan. 30, 2024

(54) AUTOMATED FLUSHING SYSTEMS AND METHODS FOR BEVERAGE DISPENSING

(71) Applicant: OASES INNOVATIONS CORPORATION, Scottsdale, AZ (US)

(72) Inventor: Connor David Kudirka, San Bernardino, CA (US)

(73) Assignee: OASES INNOVATIONS CORPORATION, Scottsdale, AZ (US)

( * ) Notice: Subject to any disclaimer, the term of this patent is extended or adjusted under 35 U.S.C. 154(b) by 0 days.

(21) Appl. No.: 17/974,387

(22) Filed: Oct. 26, 2022

(65) Prior Publication Data

US 2023/0138611 A1 May 4, 2023

Related U.S. Application Data

(60) Provisional application No. 63/272,695, filed on Oct. 28, 2021.

(51) Int. Cl.

*B67D 1/07* (2006.01)
*B67D 1/08* (2006.01)
*B67D 1/12* (2006.01)
*B67D 1/16* (2006.01)
*B67D 1/14* (2006.01)
*B67D 1/04* (2006.01)

(52) U.S. Cl.

CPC ............ *B67D 1/07* (2013.01); *B67D 1/0831* (2013.01); *B67D 1/0888* (2013.01); *B67D 1/1277* (2013.01); *B67D 1/1405* (2013.01); *B67D 1/16* (2013.01); *B67D 1/0406* (2013.01); *B67D 2001/082* (2013.01); *B67D 2210/00089* (2013.01); *B67D 2210/00091* (2013.01)

(58) Field of Classification Search

CPC ...... B67D 1/07; B67D 1/0831; B67D 1/0888; B67D 1/1277; B67D 2210/00089; B67D 1/1405; B67D 1/16; B67D 2001/082; B67D 2210/00091; B67D 1/0406

See application file for complete search history.

(56) References Cited

U.S. PATENT DOCUMENTS

| | | | | |
|---|---|---|---|---|
| 7,293,675 B1 * | 11/2007 | Luhn | B67D 1/07 222/105 |
| 7,311,224 B2 * | 12/2007 | Emmendoerfer | B67D 1/07 222/129 |
| 2006/0097003 A1 * | 5/2006 | Emmendoerfer | B08B 9/0325 222/1 |

(Continued)

*Primary Examiner* — Frederick C Nicolas
(74) *Attorney, Agent, or Firm* — PILLSBURY WINTHROP SHAW PITTMAN LLP

(57) ABSTRACT

Kegs of beer may be connected in parallel alongside one or more valves that connect to a flushing fluid supply. When a beer is selected, the associated beer valve opens so that beer can be dispensed. After a pour is completed, the system automatically flushes the beverage tubing line clean by opening a flushing fluid valve, allowing flushing fluid to cleanse the line. This flushing of the line enables the system to dispense a beer from a recently flushed line for each pour, and/or dispense many different beers because leftovers of a beer from an earlier pour do not contaminate the line for later pours. The system is also configured to measure the time poured based on information from a sensor in a dispenser (e.g., a tap handle). The time poured and a measured flow rate are used to calculate the total price to charge a customer for the beer.

25 Claims, 17 Drawing Sheets

(56) References Cited

U.S. PATENT DOCUMENTS

| | | | | |
|---|---|---|---|---|
| 2009/0014464 | A1 * | 1/2009 | Adbelmoteleb ..... | B67D 1/0028 222/1 |
| 2016/0176693 | A1 * | 6/2016 | Lawler ..................... | B67D 1/07 222/148 |

* cited by examiner

AUTOMATED FLUSHING SYSTEMS AND METHODS FOR BEVERAGE DISPENSING

CROSS-REFERENCE TO RELATED APPLICATION

This application claims the benefit of U.S. Provisional Patent Application 63/272,695, filed Oct. 28, 2021, and titled Control System for Dispensing Beverages from Multiple Pressurized and/or Non-Pressurized Containers, the disclosure of which is incorporated by reference in its entirety.

BACKGROUND OF THE INVENTION

Field of the Invention

The present disclosure relates to automated flushing systems and methods for beverage dispensing.

Description of Related Art

Systems and methods for automatically dispensing beverages and charging a user based on an amount of beverage dispensed are known. Many of these systems and methods are only capable of dispensing one beverage and/or are not capable of flushing dispensing beverage lines of the system between pours.

SUMMARY OF EMBODIMENTS OF THE INVENTION

The following is a non-exhaustive listing of some aspects of the present systems and methods. These and other aspects are described in the following disclosure.

Sources (e.g., kegs) of different beverages (e.g., beers but also other beverages) may be connected in parallel alongside one or more valves that connect to a flushing fluid (e.g., water and/or CO2) supply. When a beverage is selected on a touchscreen, the associated beverage valve opens so that beverage can be dispensed. After a pour of the beverage is completed, the system automatically flushes the beverage tubing line clean by opening a flushing fluid valve, allowing flushing fluid to cleanse the line. This flushing of the line enables the system to dispense a beverage from a recently flushed line for each pour, dispense many different beverages (e.g., because leftovers of a beverage from an earlier pour do not contaminate the line for later pours), and/or has other advantages. The system is also configured to measure the time poured based on information from a sensor in a dispenser (e.g., a tap handle). The time poured and a measured flow rate are used to calculate the total price to charge a customer for the beverage.

Accordingly, one aspect of the present disclosure relates to an automated flushing system for beverage dispensing. The system comprises beverage tubing. The beverage tubing comprises a first branch configured to couple with a first flushing fluid supply. The first branch comprises a first valve configured to control a flow of first flushing fluid from the first flushing fluid supply. The beverage tubing comprises a second branch configured to couple with a beverage source. The second branch comprises a second valve configured to control a flow of beverage from the beverage source. The system comprises a dispenser coupled to the beverage tubing downstream from the first branch and the second branch. The dispenser is configured to dispense the beverage to a user. The system comprises a controller operatively coupled to the first valve, the second valve, and the dispenser. The controller is configured to: open the first valve to fill the beverage tubing with the first flushing fluid; close the first valve and open the second valve so that beverage flows from the beverage source; determine that beverage has flowed to the dispenser based on a pressure of the beverage source, and/or a length of beverage tubing between the beverage source and the dispenser to facilitate dispensing of beverage through the dispenser; and responsive to completion of beverage dispensing, close the second valve and open the first valve to re-fill the beverage tubing with the first flushing fluid from the first flushing fluid supply.

In some embodiments, the first flushing fluid is water and/or carbon dioxide (CO2).

In some embodiments, the system further comprises a third branch of the beverage tubing configured to couple with a second flushing fluid supply. The third branch comprises a third valve configured to control a flow of second flushing fluid from the second flushing fluid supply.

In some embodiments, the controller is operatively coupled to the first valve, the second valve, the dispenser, and the third valve. The controller is configured to, responsive to completion of beverage dispensing, close the second valve and open the first valve to re-fill the beverage tubing with the first flushing fluid from the first flushing fluid supply, then close the first valve and open the third valve to fill the beverage tubing with the second flushing fluid from the second flushing fluid supply. In some embodiments, the first flushing fluid is water and the second flushing fluid is CO2.

In some embodiments, the dispenser is a trigger tap, and the trigger tap is configured to release at least some of the first flushing fluid while the trigger tap is in a closed position. For example, in some embodiments, the first flushing fluid supply may be pressurized, which may cause the trigger tap to release at least some of the first flushing fluid while the trigger tap is in the closed position.

In some embodiments, the system comprises a flow meter coupled to the beverage tubing downstream from the dispenser such that beverage flowing through the beverage tubing passes the dispenser before contacting the flow meter. The controller may be operatively coupled to the first valve, the second valve, and the dispenser, and the flow meter. The controller may be configured to: open the first valve to fill the beverage tubing with the first flushing fluid; close the first valve, and open the second valve so that beverage flows from the beverage source, past the dispenser, to the flow meter; determine that beverage is flowing through the flow meter based on a pressure of the beverage source, and/or a length of beverage tubing between the beverage source and the flow meter; and determine a flow rate for the beverage based on one or more output signals from the flow meter; facilitate dispensing of beverage through the dispenser; and responsive to completion of beverage dispensing, close the second valve, and open the first valve, to re-fill the beverage tubing with the first flushing fluid from the first flushing fluid supply.

In some embodiments, the dispenser comprises a sensor configured to generate one or more output signals indicating that beverage is being dispensed through the dispenser. The controller is operatively coupled to the sensor. The controller is configured to determine an amount of beverage dispensed through the dispenser based on the one or more output signals from the sensor, and/or the one or more output signals from the flow meter.

In some embodiments, the sensor comprises a button and/or a latch configured to indicate when a handle of the dispenser is moved from a closed position to an open position or vice versa.

In some embodiments, the controller is configured to determine a cost of the beverage dispensed through the dispenser based on the amount of beverage dispensed through the dispenser.

In some embodiments, the system comprises a drain valve coupled to the beverage tubing and configured to control a flow of first flushing liquid and/or beverage to a drain. The controller is operatively coupled to the first valve, the second valve, the dispenser, and the drain valve. The controller is configured to: open the first valve and the drain valve to fill the beverage tubing with flushing fluid, and close the drain valve once the beverage tubing is filled with flushing fluid; close the first valve, open the drain valve, and open the second valve so that beverage flows from the beverage source, past the dispenser, to the drain; close the drain valve to facilitate dispensing of beverage through the dispenser; and responsive to completion of beverage dispensing, close the second valve, open the first valve, and open the drain valve to re-fill the beverage tubing with the first flushing fluid from the first flushing fluid supply, and close the drain valve.

In some embodiments, the system comprises one or more additional parallel second branches of the beverage tubing configured to couple with one or more additional parallel second beverage sources. The one or more additional parallel second branches each comprise an additional valve configured to control a flow of beverage from a respective beverage source.

In some embodiments, the controller is configured to, responsive to completion of beverage dispensing from any of the one or more additional parallel second beverage sources, close the additional valve, and open the first valve, to re-fill the beverage tubing with the first flushing fluid from the first flushing fluid supply.

In some embodiments, the controller is configured to control flow from a respective beverage source based on user selection of that beverage source.

In some embodiments, the system comprises a user interface operatively coupled to the controller. The user interface is configured to receive information from and provide information to the user. The information received from, or provided to, the user comprises: a radio frequency identification (RFID) associated with the user; user credit card information; a beverage menu comprising one or more additional parallel beverages for selection by the user; an instruction to begin pouring a given beverage once a flow rate for the given beverage has been determined; a charge for an amount of beverage dispensed; and/or a receipt for the charged amount.

In some embodiments, the first valve is a electric solenoid valve. In some embodiments, the second valve is an electric motorized ball valve. In some embodiments, the first branch comprises a one way check valve configured to prevent back flow to the first flushing fluid supply, and is coupled to the second branch by a three way tube tee. In some embodiments, the second branch is coupled to the first branch by a three way tube tee so that the beverage and the first flushing fluid can both flow toward the dispenser. In some embodiments, the dispenser is coupled to the beverage tubing by a three way tube tee, with a one way check valve along the beverage tubing on a downstream side of the three way tube tee.

In some embodiments, the system comprises a pump coupled to the beverage tubing downstream from the dispenser. In some embodiments, the pump is operatively coupled to the controller, and the pump is configured to be actuated if necessary by the controller to pump the first flushing fluid and/or the beverage through the beverage tubing.

In some embodiments, the beverage is beer, and the beverage source is a keg of the beer.

Another aspect of the present disclosure relates to a method for automated flushing of a system for beverage dispensing, comprising one or more of the operations performed by the system described above.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of “a”, “an”, and “the” include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

As described above, with the present system(s) and method(s), one or more sources (e.g., kegs) of different beverages (e.g., different beers) may be connected in parallel alongside one or more valves that connect to a flushing fluid (e.g., water and/or CO2) supply. When a beverage is selected, an associated beverage valve opens so that beverage can be dispensed. After a pour of the beverage is completed, the system automatically flushes the beverage tubing line clean by opening the one or more valves that connect to the flushing fluid supply, allowing flushing fluid to cleanse the line. Advantageously, this flushing of the line enables the system to dispense a beverage from a recently flushed line for each pour, dispense many different beverages (e.g., because leftovers of a beverage from an earlier pour do not contaminate the line for later pours), and/or has other advantages. The system is also configured to measure the time poured based on information from a sensor in a dispenser (e.g., a tap handle). The time poured and a measured flow rate are used to calculate the total price to charge a customer for the beverage. Further, as described below, in some embodiments, the system comprises a solenoid valve alongside the CO2 and/or water lines that can be connected to a tank of flushing and/or other cleaning solution that can be configured to clean the lines on a regular (i.e. hourly/daily/weekly) basis for further line cleansing. In some embodiments, payment processing works alongside a PLC in the present system. Also, a conveniently configured handle latch (described below) can be utilized to measure pour time, as described below.

Figure 1:
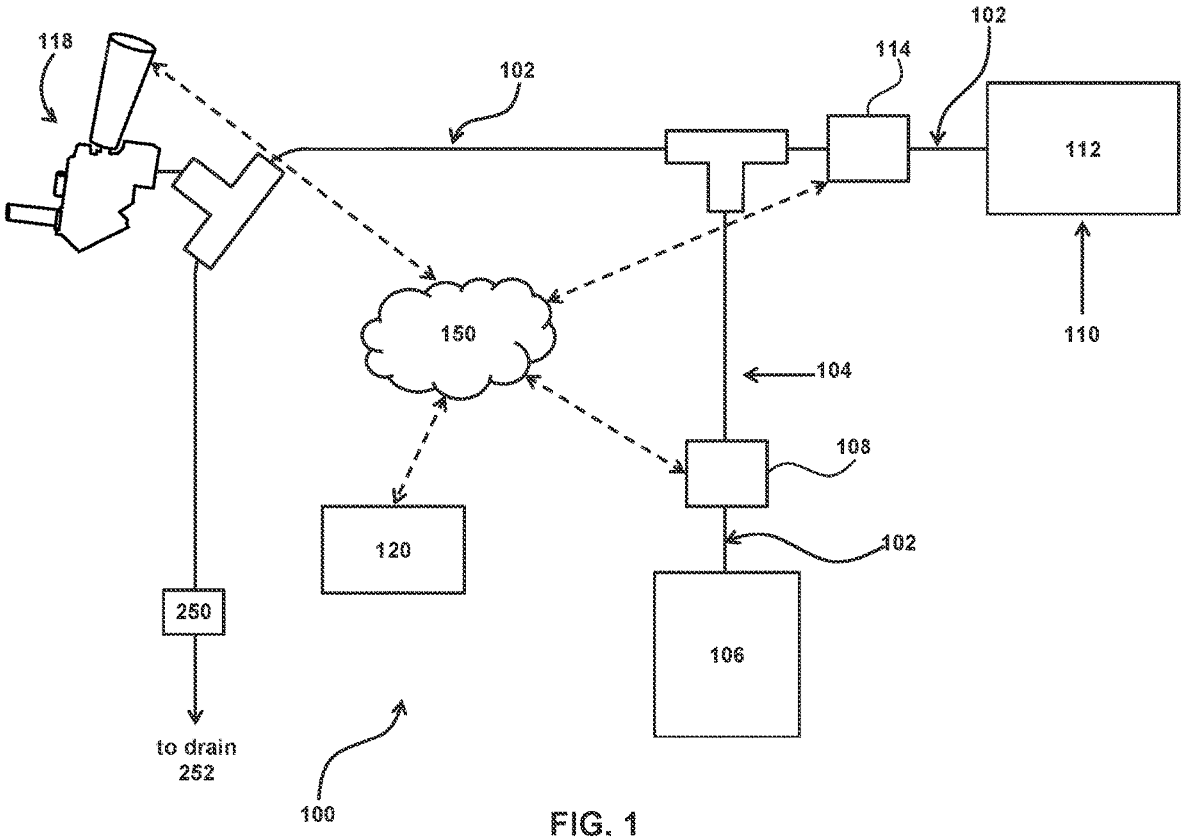
FIG. 1 illustrates an automated flushing system for beverage dispensing, in accordance with one or more embodiments.

FIG. 1 illustrates an automated flushing system 100 for beverage dispensing. System 100 comprises beverage tubing 102, a (e.g., first) flushing fluid supply 106 and a first valve 108, a (e.g., first) beverage source 112 and a second valve 114, a dispenser 118, a controller 120, and/or other components. As shown in FIG. 1, beverage tubing 102 comprises a first branch 104 configured to couple with first flushing fluid supply 106. Beverage tubing 102 may have any size and/or shape, and/or may be made from any material that allows it to function as described herein. As one possible example, beverage tubing may be between 4 mm and % inch diameter beverage tubing. Multiple kinds of tubing may be used to prevent off-flavors, and/or for other reasons. In some embodiments, the tubing is a special non-porous tubing specifically designed to prevent flavor cross-over from one beverage to another. The materials and size of the tubing depend on both the level of resistance required as well as the potential for off flavors in the line (i.e. the drain lines in system 100 are different from the main line leading to the nozzle—as described below). Overall the materials of the lines may generally comprise polyolefin with glas-flex from Accuflex Bev Seal, ethylene-vinyl acetate from EVABarrier, and/or other tubing. In some embodiments, beverage tubing 102 may comprise food and beverage grade stainless steel tubing, for example. In some embodiments, system 100 may include and/or be coupled to a glycol system to keep a beverage tubing temperature at a steady desired number (with flow rate depending on temperature use of a glycol system—unless the system is connected directly in front of a "cold room", for example). System 100 may also include a thermocouple connected to the controller to determine proper temperature regulation methods (i.e. distance from "cold room", circulating glycol—water mix proportions, and/or internal refrigeration of system). In some embodiments, an entirety of system 100 may be refrigerated.

First branch 104 comprises first valve 108. First valve 108 is configured to control a flow of first flushing fluid from first flushing fluid supply 106. In some embodiments, the first flushing fluid is water and/or carbon dioxide (CO2), for example. Beverage tubing 102 comprises a second branch 110 configured to couple with beverage source 112. Second branch 110 comprises second valve 114. Second valve 114 is configured to control a flow of beverage from beverage source 112. In some embodiments, the beverage is beer, and beverage source 112 is a keg of the beer, for example.

Dispenser 118 is coupled to beverage tubing 102 downstream from first branch 104 and second branch 110. Dispenser 118 is configured to dispense the beverage to a user. In some embodiments, dispenser 118 is a trigger tap, and the trigger tap is configured to release at least some of the first flushing fluid while the trigger tap is in a closed position. For example, in some embodiments, first flushing fluid supply 106 may be pressurized, which may cause the trigger tap to release at least some of the first flushing fluid while the trigger tap is in the closed position. Pressure for first flushing fluid supply 106 may be provided by a gas pressure source (e.g., a pressurized carbon dioxide (CO2) source), gravity (e.g., a flushing fluid tank may be placed at a higher elevation compared to other components of system 100), and/or by other sources. In some embodiments, the trigger tap requires a serving pressure of around 10 psi or else it leaks fluid—hence system 100 may be configured to use a pressure less than 10 PSI to force the leak, for example.

Controller 120 is operatively coupled to first valve 108, second valve 114, dispenser 118, and/or other components (e.g., as described below). These devices may communicate via a network 150, such as the Internet or the Internet in combination with various other networks, like local area networks, cellular networks, or personal area networks, internal organizational networks, and/or other networks. In some embodiments, these devices may communicate via near field communication protocols, Bluetooth, and/or other communication frameworks. In some embodiments, these devices may communicate via light based communication techniques. In some embodiments, these devices may be configured to communicate via wired connections between devices.

Controller 120 is configured to open first valve 108 to fill beverage tubing 102 with the first flushing fluid. Controller 120 is configured to close first valve 108 and open second valve 114 so that beverage flows from beverage source 112. Controller 120 is configured to determine that beverage has flowed to dispenser 118 based on a pressure of beverage source 112, a length of beverage tubing 102 between beverage source 112 and dispenser 118, and/or other information, to facilitate dispensing of beverage through dispenser 118. Responsive to completion of beverage dispensing, controller 120 is configured to close second valve 114 and open first valve 108 to re-fill beverage tubing 102 with the first flushing fluid from first flushing fluid supply 106.

Figure 2:
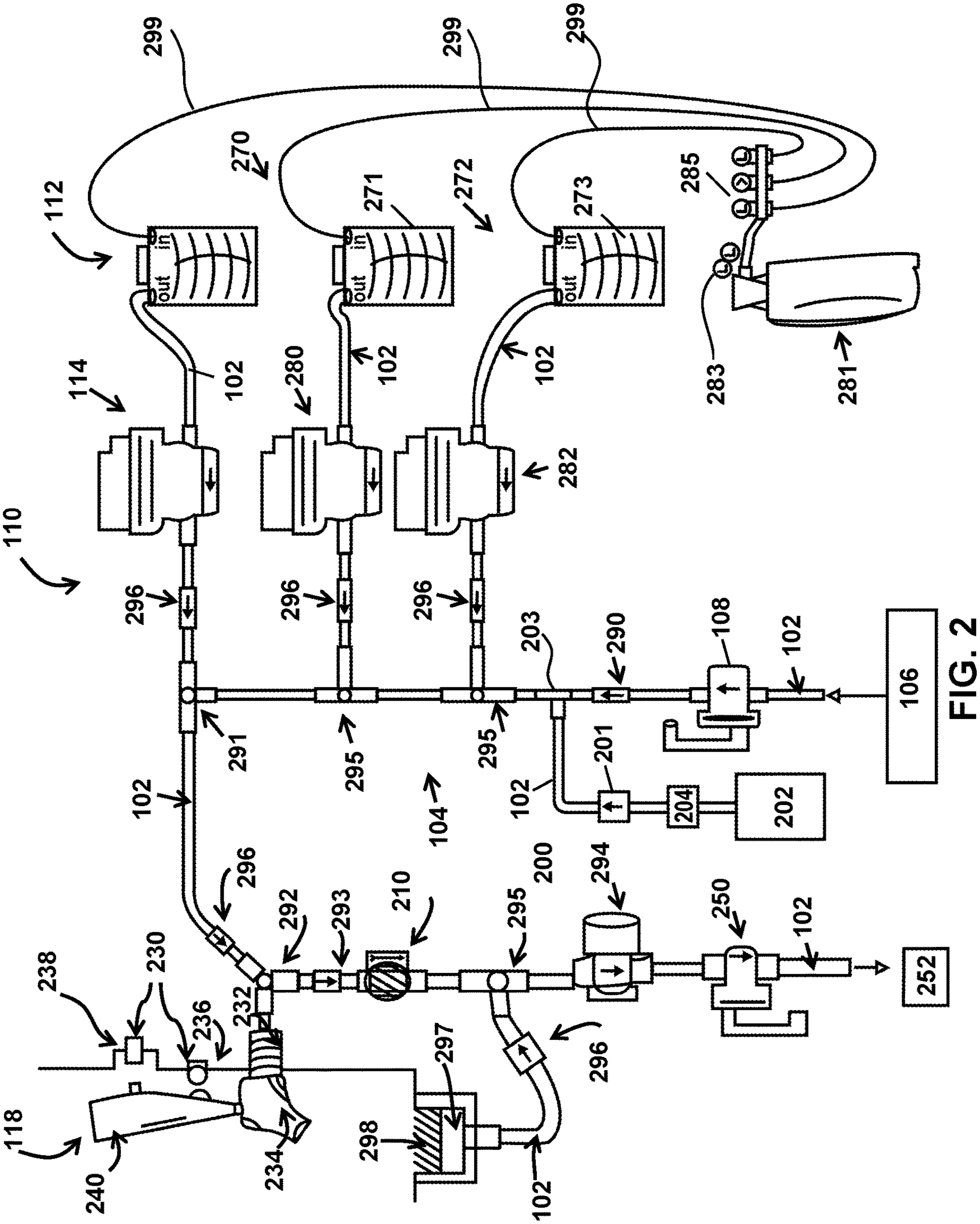
FIG. 2 illustrates another embodiment of the system, showing additional possible components of the system, in accordance with one or more embodiments.

FIG. 2 illustrates another embodiment of system 100, showing additional possible components of system 100. For example, in some embodiments, system 100 comprises a third branch 200 of beverage tubing 102 configured to couple with a second flushing fluid supply 202. Third branch 200 comprises a third valve 204 configured to control a flow of second flushing fluid from second flushing fluid supply 202. In some embodiments, controller 120 (shown in FIG. 1) is operatively coupled to first valve 108, second valve 114, dispenser 118, and third valve 204. Controller 120 is configured to, responsive to completion of beverage dispensing, close second valve 114 and open first valve 108 to re-fill beverage tubing 102 with the first flushing fluid from first flushing fluid supply 106, then close first valve 108 and open third valve 204 to fill beverage tubing 102 with the second flushing fluid from second flushing fluid supply 202. In some embodiments, the first flushing fluid is water and the second flushing fluid is CO2, for example.

In some embodiments, system 100 comprises a flow meter 210 coupled to beverage tubing 102 downstream from dispenser 118 such that beverage flowing through beverage tubing 102 passes dispenser 118 before contacting flow meter 210. Controller 120 (FIG. 1) may be operatively coupled to first valve 108, second valve 114, (third valve 204) dispenser 118, and flow meter 210. Controller 120 may be configured to: open first valve 108 to fill the beverage tubing with the first flushing fluid (e.g., water); close first valve 108, and open second valve 114 so that beverage flows from beverage source 112, past dispenser 118, to flow meter 210; determine that beverage is flowing through flow meter 210 based on a pressure of beverage source 112, a length of beverage tubing 102 between beverage source 112 and flow meter 210, and/or other information; and determine a flow rate for the beverage based on one or more output signals from flow meter 210. Controller 120 is configured to facilitate dispensing of beverage through dispenser 118; and responsive to completion of beverage dispensing, close second valve 114, and open first valve 108 (and/or third valve 204), to re-fill beverage tubing 102 with the first flushing fluid (e.g., water) from first flushing fluid supply 106 (and/or the second flushing fluid (e.g., CO2) from second flushing fluid supply 202). In some embodiments, flow meter 210 may be located in another location in system 100 (e.g., upstream from the location shown in FIG. 2) and still configured to function as described.

In some embodiments, dispenser 118 comprises a sensor 230 configured to generate one or more output signals indicating that beverage is being dispensed through dispenser 118. For example, beverage may be dispensed through a shank 232, a faucet 234, and/or other components of dispenser 118. Controller 120 (FIG. 1) is operatively coupled to sensor 230 (and/or the other components of system 100 as described above). Controller 120 is configured to determine an amount of beverage dispensed through dispenser 118 based on the one or more output signals from sensor 230, one or more output signals from flow meter 210, and/or other information. In some embodiments, sensor 230 comprises a button 236 and/or a latch 238 configured to indicate when a handle 240 of dispenser 118 is moved from a closed position to an open position or vice versa. In some embodiments, sensor 230 comprises a camera configured to sense and/or determine an amount of beverage that has been poured, and/or other sensors.

In some embodiments, system 100 comprises a drain valve 250 coupled to beverage tubing 102. Drain valve 250 may be coupled to beverage tubing 102 downstream from dispenser 118 and flow meter 210, for example. Drain valve 250 is configured to control a flow of first flushing liquid and/or beverage to a (main) drain 252. In some embodiments, controller 120 (FIG. 1) is operatively coupled to first valve 108, second valve 114, (third valve 204) (flow meter 210) dispenser 118 (and/or sensor 230 of dispenser 118), and drain valve 250. Controller 120 is configured to open first valve 108 and drain valve 250 to fill beverage tubing 102 with flushing fluid (e.g., water, or water and then CO2 as described above), and close drain valve 250 once beverage tubing 102 is filled with flushing fluid. Controller 120 is configured to close first valve 108, open drain valve 250, and open second valve 114 so that beverage flows from beverage source 112, past dispenser 118, to drain 252. Controller 120 is configured to close drain valve 250 to facilitate dispensing of beverage through dispenser 118. Responsive to completion of beverage dispensing, controller 120 is configured to close second valve 114, open first valve 108, and open drain valve 250 to re-fill beverage tubing 102 with the first flushing fluid (e.g., water) from first flushing fluid supply 106 and/or the second flushing fluid (e.g., CO2) from second flushing fluid supply 202 (e.g., water and then CO2 as described above), and close drain valve 250.

In some embodiments, system 100 comprises one or more additional parallel second branches 270, 272, etc., of beverage tubing 102 configured to couple with one or more additional parallel second beverage sources 271, 273, etc. The one or more additional parallel second branches 270, 272, etc., each comprise an additional valve 280, 282, etc., configured to control a flow of beverage from a respective beverage source 271, 273, etc. The additional beverage sources 271, 273, etc., may be additional kegs of different beers, for example, and/or other beverages. In some embodiments, controller 120 (FIG. 1) is configured to, responsive to completion of beverage dispensing from any of the one or more additional parallel second beverage sources 217, 273, etc., close the corresponding additional valve 280, 282, etc., and open first valve 108 (and/or third valve 204), to re-fill beverage tubing 102 with the first flushing fluid (e.g., water) from first flushing fluid supply 106 and/or with the second flushing fluid (e.g., CO2) from second flushing fluid supply 202 (e.g., as described above).

In some embodiments, first valve 108, third valve 204, and/or other valves may be electric solenoid valves, as one example, though generally any kind of electric valve may be used that functions as described herein. In some embodiments, second valve 114, additional valves 280, 282, etc., and/or other valves may be electric motorized ball valves, as one example, diaphragm valves, certain specific electric solenoid valves, electric butterfly valves, other valves designed to prevent beer foaming issues, and/or other valves.

As shown in FIG. 2, system 100 may include other various components. For example, in some embodiments, first branch 104 comprises a one way check valve 290 configured to prevent back flow to first flushing fluid supply 106, and is coupled to the second branch by a three way tube tee 291. Second branch 110 is coupled to first branch 104 by three way tube tee 291 so that the beverage and the first flushing fluid (and/or the second flushing fluid) can both flow toward dispenser 118. Third branch 200 may comprise a similar one way check valve 201 configured to prevent back flow to second flushing fluid supply 202, and is coupled to first branch 104 by a three way tube tee 203. In some embodiments, dispenser 118 is coupled to beverage tubing 102 by a three way tube tee 292, with a one way check valve 293 along beverage tubing 102 on a downstream side of three way tube tee 292.

In some embodiments, system 100 comprises a pump 294 coupled to beverage tubing 102 downstream from dispenser 118. In some embodiments, pump 294 is operatively coupled to controller 120 (FIG. 1), and pump 294 is configured to be actuated if necessary by controller 120 to pump the first flushing fluid, the second flushing fluid, and/or the beverage through beverage tubing 102. In some embodiments, various additional three way tube tees 295 are used to couple different branches of beverage tubing 102. Similarly, one or more various optional additional one way check valves 296 may be used to prevent backflow through various portions of beverage tubing 102 (though these are not required).

In some embodiments, system 100 includes a CO2 tank 281 for providing CO2 to beverage sources 112, 271, 273, etc. via CO2 lines 299. CO2 pressure in tank 281 may be controlled by one or more regulators 283, 285, for example. In some embodiments, CO2 tank 281 may be coupled to the beverage sources, and/or the flushing fluid supply (or supplies). In some embodiments, CO2 tank 281 (and/or the flushing fluid source (e.g., of water and/or CO2)) may use very low amounts of carbonation (e.g., under 5 psi).

In some embodiments, system 100 may also include a dispenser drain 297, a corresponding drain plate 298, and/or other components that make it more convenient for a user to pour a beverage from dispenser 118. In some embodiments, dispenser drain 297 and drain plate 298 are configured to catch liquid that drips (intentionally as described above or unintentionally) from faucet 234.

Note that the exact numbers, types, and/or locations, of valves, pumps, tee connections, beverage sources, beverage tubing branches, flushing fluid sources, etc., shown in FIG. 1, FIG. 2, and/or other figures are examples only. System 100 may be configured with any number of these components provided system 100 functions as described herein. For example, alternative configurations of system 100 are contemplated. In some embodiments, a second valve or a third valve on the beverage tubing flushing branch may be included. In some embodiments, these and/or other valves may facilitate connecting an air/CO2 valve to a tee that connects to a pump configured to pump out stagnant water and/or other flushing fluid without the need for CO2. (This configuration may be more economical than other configurations described herein, for example.) In some embodiments, system 100 may be configured such that compressed air, nitrogen, and/or other gasses may be used for a CO2 valve. In some embodiments, system 100 may use a beer cleaning solution for a water valve, a CO2 valve, and/or another flushing fluid valve. Any combination or addition of said valve setups alongside flushing fluid branch(es) of the system may be used, for example. In some embodiments, an alternate configuration of the system may include one where all flushing fluid is forced through the nozzle, thus bypassing the drain valve to drain through a drain plate and standard drain line.

In some embodiments, controller 120 (FIG. 1) is configured to control flow from a respective beverage source 112, 271, 273, etc., based on user selection of that beverage source. In some embodiments, system 100 comprises a user interface operatively coupled to controller 120. The user interface is configured to receive information from and provide information to the user. The information received from, or provided to, the user comprises: a radio frequency identification (RFID) associated with the user; user credit card information; a beverage menu comprising one or more additional parallel beverages for selection by the user; an instruction to begin pouring a given beverage once a flow rate for the given beverage has been determined; a charge for an amount of beverage dispensed; a receipt for the charged amount, and/or other information. For example, in some embodiments, controller 120 is configured to determine a cost of the beverage dispensed through dispenser 118 based on the amount of beverage dispensed through dispenser 118, communicate that cost to the user, and charge the user (e.g., a user's credit card) for the beverage. By way of a non-limiting example, in some embodiments, system 100 first calibrates to find the flow rate associated with a beer keg at its set pressure/temperature. It then reads the time of pour from the sensor in the dispenser and uses that in conjunction with the known flow rate to determine an amount poured. The known price/ounce*the total ounces poured is used to calculate the final price. The one or more processors described herein may then build a buffer of hex codes associated with the total price and sends those hex codes via RS232 serial connection to a terminal where credit card data is being held. Once the credit card is committed to that final price, the session is concluded and the terminal is ready for the next user. As another example, RFID tags may be used to verify that a user is over 21 (or other minimum legal drinking age). If a user wants to pour a beer or another alcoholic beverage from system 100, system 100 may be configured such that they must have an RFID tag issued from the businesses employees after visual confirmation of an ID/age verification. System 100 may be configured to read the RFID tag number, confirm that the tag is legitimate and then grant the user access to the alcoholic menu page (e.g., via a display as described herein). It may also then issue a total amount that each tag can pour based on how much the maximum amount of alcohol business owner would like to limit each customer to. In some embodiments, system 100 may be configured to bypass the RFID tag verification once more states begin to issue "virtual IDs" that provide barcodes that interfaces can use to verify age for sales of alcohol. Virtual IDs are like licenses for phones issued on a smartphone application that include barcodes and a QR code scanner designed to pass ID related information. Once states approve of these for alcohol purchases, system 100 may be configured to issue a QR code on the display (described herein) and/or integrate a barcode reader that will pass through users age and verify ages over 21 instead of relying on employees to verify age and hand out RFID tags, for example.

Figure 3:
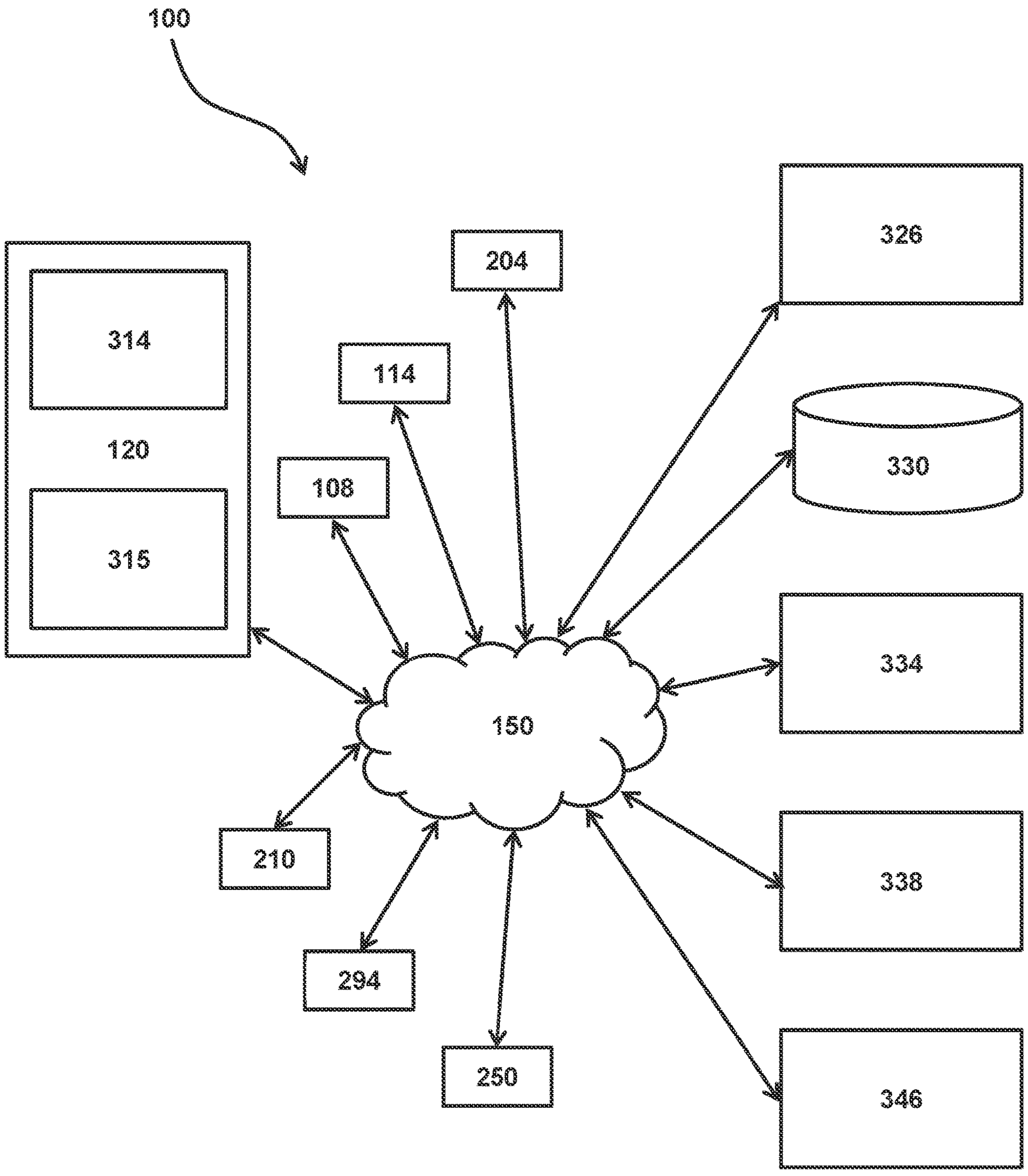
FIG. 3 illustrates aspects of the system controller, in accordance with one or more embodiments.

FIG. 3 illustrates aspects of controller 120 (along with other various components of system 100). Controller 120 is configured to control one or more components of system 100 (as described above) by sending electronic signals to the one or more components to cause the one or more components to take some action (e.g., open or close a valve, etc.) In some embodiments, controller 120 comprises a processor 314 and/or other components, which may be configured to communicate with (e.g., via network 150 and/or other communication channels) a server 326, a data store 330, a mobile user device 334, a desktop user device 338, external resources 346, network 150, and/or other components. In some embodiments, one or more of these components is included in controller 120. Each of these components is described, in turn, below.

Processor 314 is configured to provide information-processing capabilities in system 100. As such, processor 314 may comprise one or more of a digital processor, an analog processor, a digital circuit designed to process information, an analog circuit designed to process information, a state machine, and/or other mechanisms for electronically processing information. Although processor 314 is shown in FIG. 3 as a single entity, this is for illustrative purposes only. In some embodiments, processor 314 may comprise a plurality of processing units. These processing units may be physically located within the same device (e.g., server 326, mobile user device 334, desktop user device 338, etc.), or processor 314 may represent processing functionality of a plurality of devices operating in coordination. In some embodiments, processor 314 may be and/or be included in a computing device such as a desktop computer, a laptop computer, a smartphone, a tablet computer, a server, and/or other computing devices. These computing devices may run one or more electronic applications having graphical user interfaces configured to facilitate user interaction with system 100.

As shown in FIG. 3, processor 314 is configured by machine readable instructions 315 to execute one or more of the operations described herein. Machine readable instructions 315 may comprise software programs and/or algorithms coded and/or otherwise defined by machine readable instructions 315 and/or embedded in processor 314, for example. Processor 314 may be configured to execute machine readable instructions 315 by software; hardware; firmware; some combination of software, hardware, and/or firmware; and/or other mechanisms for configuring processing capabilities on processor 314. In some embodiments, processor 314 is executed by one or more of the computers described below with reference to FIG. 16. The components of system 100, in some embodiments, communicate with one another in order to provide the functionality of processor 314, and/or other components described herein. In some embodiments, data store 330 may store data about a beverage, a cost, a user's credit card, an RFID associated with a user, or other information. Server 326 may expedite access to this data by storing likely relevant data in relatively high-speed memory, for example, in random-access memory or a solid-state drive. Server 326 may communicate with webpages and/or other sources of network information (e.g., a webpage illustrating a beverage menu). Server 326 may serve data to various applications that process data related to beverage dispensing, cost calculations, and/or other data. The operation of server 326 and data store 330 may be coordinated by one or more processors 314, which may bidirectionally communicate with each of these components or direct the components to communicate with one another. Communication may occur by transmitting data between separate computing devices (e.g., via transmission control protocol/internet protocol (TCP/IP) communication over a network), by transmitting data between separate applications or processes on one computing device; or by passing values to and from functions, modules, or objects within an application or process, e.g., by reference or by value.

In some embodiments, interaction with users (e.g., sending and/or receiving requests for a beverage, payment information, etc.) may be facilitated by processor 314, server 326, mobile user device 334, desktop user device 338, and/or other components. This may occur via a website or a native application displayed by a display on a desktop computer (e.g., desktop user device 338), a mobile computer (e.g., mobile user device 34) such as a tablet, or a laptop of the user. In some embodiments, such interaction occurs via a mobile website viewed on a smart phone, tablet, or other mobile user device, or via a special-purpose native application executing on a smart phone, tablet, or other mobile user device.

To illustrate an example of the environment in which processor 314 operates, the illustrated embodiment of FIG. 3 includes a number of components with which processor 314 communicates: system 100 components 108, 114, 204, 210, 250, 294, etc. as shown in FIG. 1 and FIG. 2; server 326; data store 330; mobile user device(s) 334; a desktop user device 338; and external resources 346. These devices communicate with processor 314 via a network 150, such as the Internet or the Internet in combination with various other networks, like local area networks, cellular networks, or personal area networks, internal organizational networks, and/or other networks.

Mobile user device(s) 334 may be smart phones, tablets, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of mobile user device(s) 334 may store instructions that when executed by the associated processor provide an operating system and various applications, including a web browser and/or a native mobile application.

Desktop user device(s) 338 may also include a web browser, a native application, and/or other components. In addition, desktop user device(s) 338 may include a monitor; a keyboard; a mouse; memory; a processor; and a tangible, non-transitory, machine-readable memory storing instructions that when executed by the processor provide an operating system, the web browser, the native application, and/or other components. Native applications and web browsers, in some embodiments, are operative to provide a graphical user interface that communicates with processor 314 and facilitates user interaction with data from processor 314. Web browsers may be configured to receive a web site and/or other web based communications from processor 314 having data related to instructions (for example, instructions expressed in JavaScript™) that when executed by the browser (which is executed by a processor) cause mobile user device 334 and/or desktop user device 338 to communicate with processor 314 and facilitate user interaction with data from processor 314. Native applications and web browsers, upon rendering a webpage and/or a graphical user interface from processor 314, may generally be referred to as client applications of processor 314 (and/or server 326, which may include processor 314), which in some embodiments may be referred to as a server. Embodiments, however, are not limited to client/server architectures, and processor 314, as illustrated, may include a variety of components other than those functioning primarily as a server.

External resources 346, in some embodiments, include sources of information such as databases, websites, etc.; external entities participating with system 100 (e.g., systems or networks that store beverage menus and/or costs, etc.; one or more servers outside of system 100; a network (e.g., the internet); electronic storage; equipment related to Wi-Fi™ technology; equipment related to Bluetooth® technology; data entry devices; or other resources. In some embodiments, some or all of the functionality attributed herein to external resources 346 may be provided by resources included in system 100. External resources 346 may be configured to communicate with processor 314, server 326, mobile user devices 334, desktop user devices 338, and/or other components of system 100 via wired and/or wireless connections, via a network (e.g., a local area network and/or the internet), via cellular technology, via Wi-Fi technology, and/or via other resources. The number of illustrated processors 314, external resources 346, servers 326, desktop user devices 338, and mobile user devices 334 is selected for explanatory purposes only, and embodiments are not limited to the specific number of any such devices illustrated by FIG. 3, which is not to imply that other descriptions are limiting.

System 100 includes a number of components introduced above that facilitate requests for beverages by users, payment information, and/or other information. For example, server 326 may be configured to communicate data about beverage requests, beverage costs, credit card information, and/or other information via a protocol, such as a representational-state-transfer (REST)-based API protocol over hypertext transfer protocol (HTTP), MQTT, and/or other protocols. Examples of operations that may be facilitated by server 326 include requests to for payment information, or other information. API requests may identify which data is to be displayed, linked, modified, added, or retrieved by specifying criteria for identifying records, such as queries for retrieving or processing information about a particular credit card for example. In some embodiments, server 326 communicates with the native applications of mobile user device 334 and desktop user device 338, and/or other components of system 100 (e.g., e.g., to send and/or receive such requests).

Server 326 may be configured to display, link, modify, add, or retrieve portions or all data related to a beverage, beverage cost, credit card information, and/or other information encoded in a webpage (e.g. a collection of resources to be rendered by the browser and associated plug-ins, including execution of scripts, such as JavaScript™, invoked by the webpage), or in a graphical user interface display, for example. In some embodiments, a graphical user interface presented by the webpage may include inputs by which the user may enter or select data, such as clickable or touchable display regions or display regions for text input. Such inputs may prompt the browser to request additional data from server 326 or transmit data to server 326, and server 326 may respond to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g. JavaScript™ object notation (JSON) or extensible markup language (XML). Server 326 may communicate with web browsers executed by user devices 334 or 338, and/or a native application run by these devices, for example. In some embodiments, a webpage is modified by server 326 based on the type of user device, e.g., with a mobile webpage having fewer and smaller images and a narrower width being presented to the mobile user device 334, and a larger, more content rich webpage being presented by desktop user device 338, for example. An identifier of the type of user device, either mobile or non-mobile, for example, may be encoded in the request for the webpage by the web browser (e.g., as a user agent type in an HTTP header associated with a GET request), and server 326 may select the appropriate interface based on this embedded identifier, thereby providing an interface appropriately configured for the specific user device in use.

Data store 330 stores data related to beverages, prices, credit card information, requests for such data, results from such requests, etc. Data store 330 may include various types of data stores, including relational or non-relational databases, document collections, hierarchical key-value pairs, or memory images, for example. Such components may be formed in a single database, document, or other component, or may be stored in separate data structures. In some embodiments, data store 330 comprises electronic storage media that electronically stores information. The electronic storage media of data store 330 may include one or both of system storage that is provided integrally (i.e., substantially non-removable) with system 100 and/or removable storage that is removably connectable to system 100 via, for example, a port (e.g., a USB port, a firewire port, etc.) or a drive (e.g., a disk drive, etc.). Data store 330 may be (in whole or in part) a separate component within system 100, or data store 330 may be provided (in whole or in part) integrally with one or more other components of the system 100 (e.g., processors 314, etc.). In some embodiments, data store 330 may be located in a data center, in server 326, in a server that is part of external resources 346, in a computing device 334 or 338, or in other locations. Data store 330 may include one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), or other electronically readable storage media. Data store 330 may store software algorithms, information determined by processor 314, information received via a graphical user interface displayed on computing devices 334 and/or 338, information received from external resources 346, or other information accessed by system 100 to function as described herein.

Figure 4:
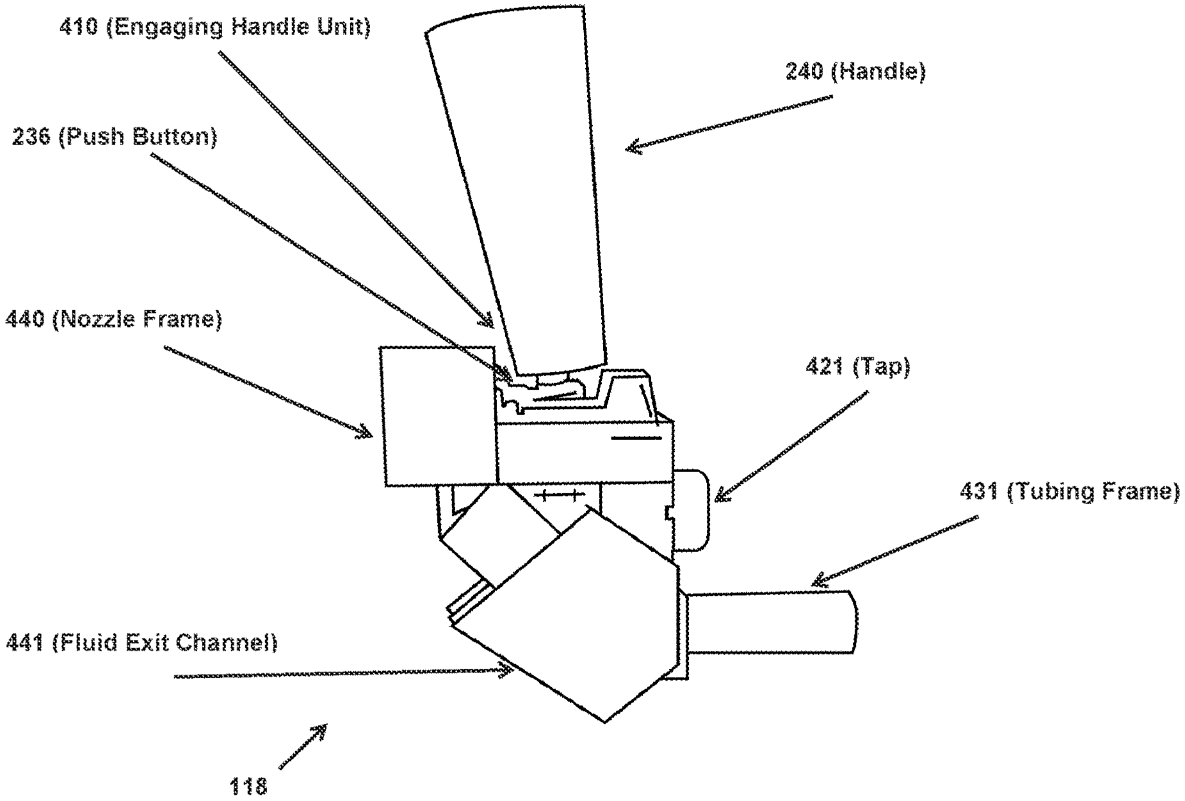
FIG. 4 illustrates a first side view of a dispenser of the system, in accordance with one or more embodiments.
Figure 5:
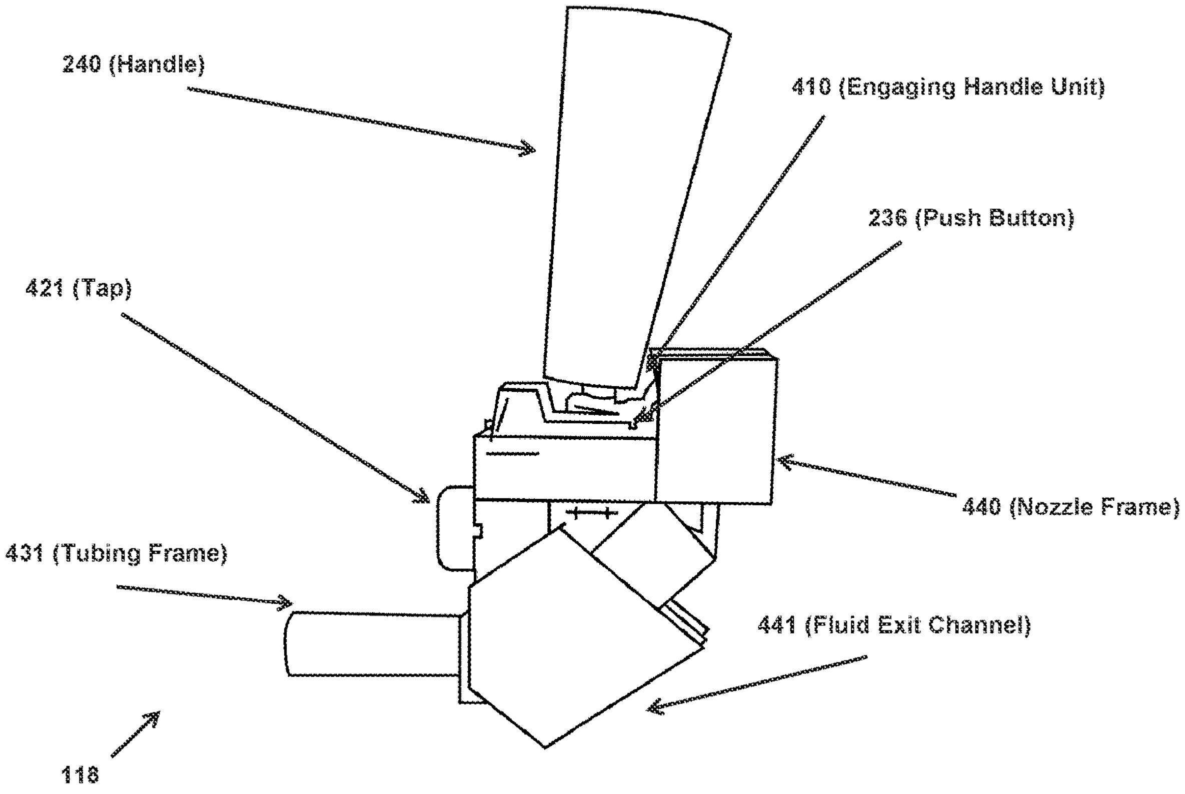
FIG. 5 is an opposite side view of the dispenser, in accordance with one or more embodiments.
Figure 6:
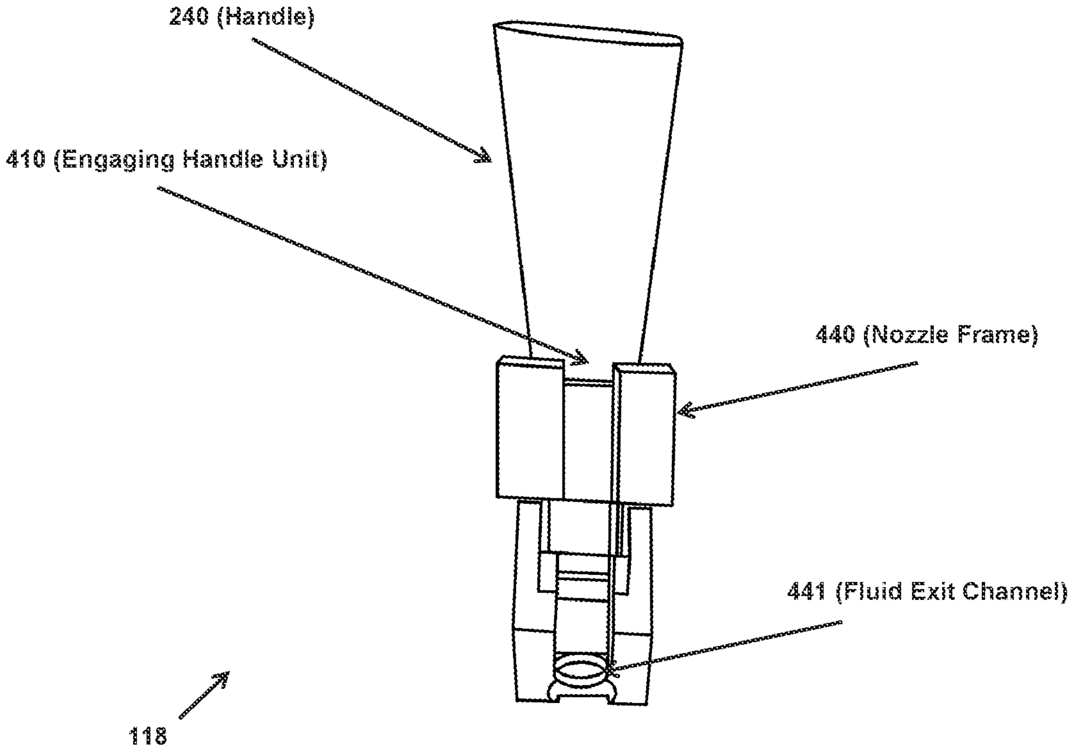
FIG. 6 is an upper perspective view of the dispenser, in accordance with one or more embodiments.
Figure 7:
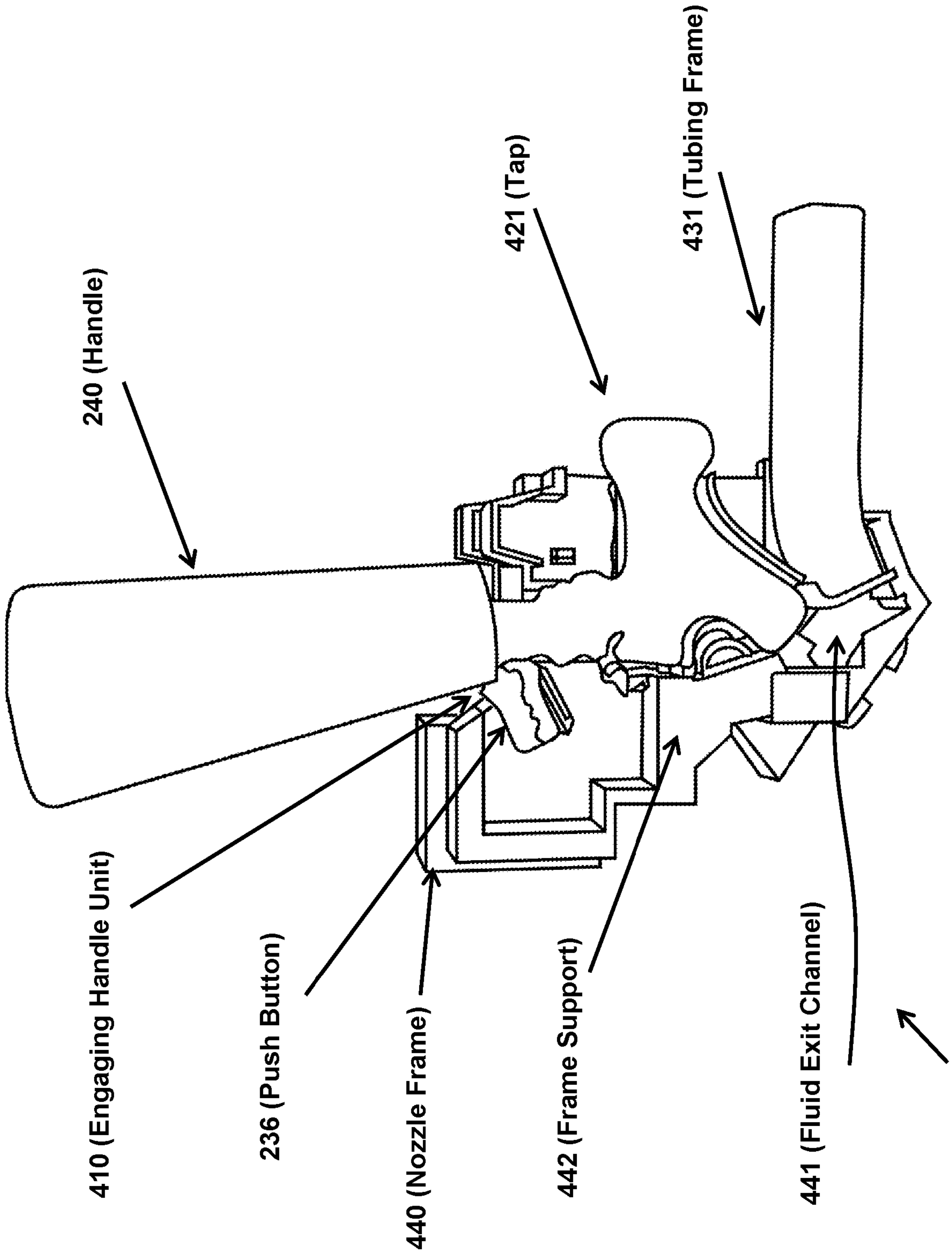
FIG. 7 is an exploded upper perspective view of the dispenser, in accordance with one or more embodiments.
Figure 8:
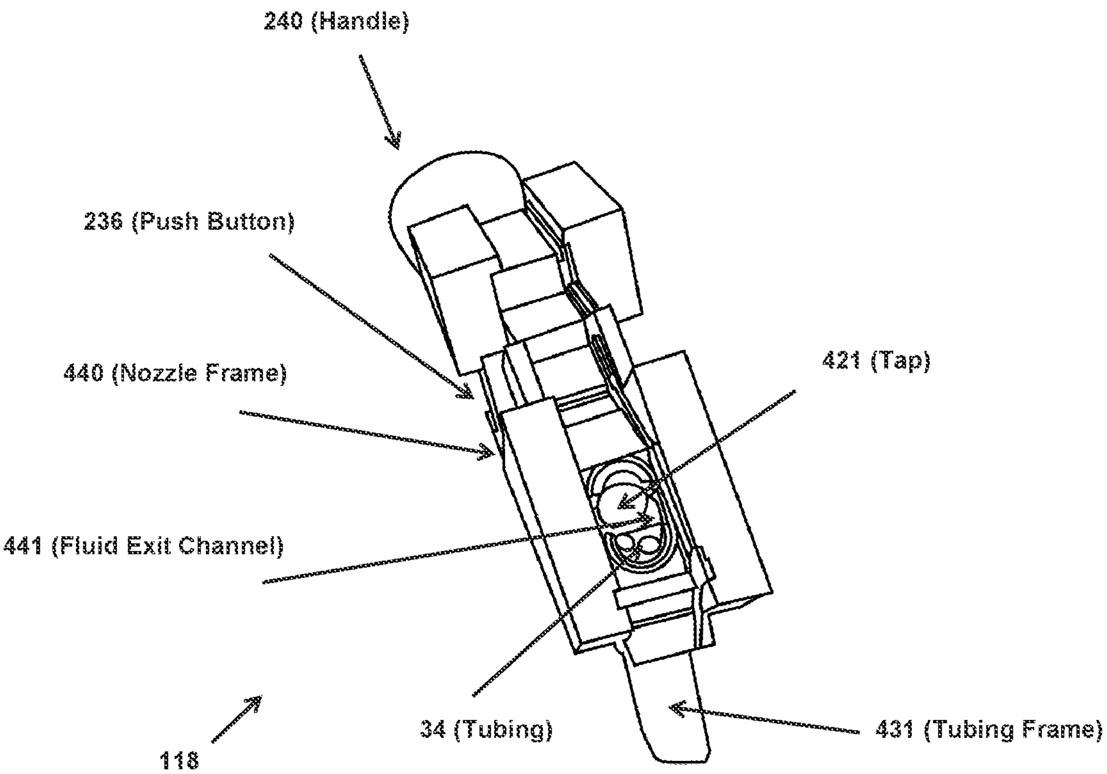
FIG. 8 is a lower perspective view of the dispenser, in accordance with one or more embodiments.
Figure 9:
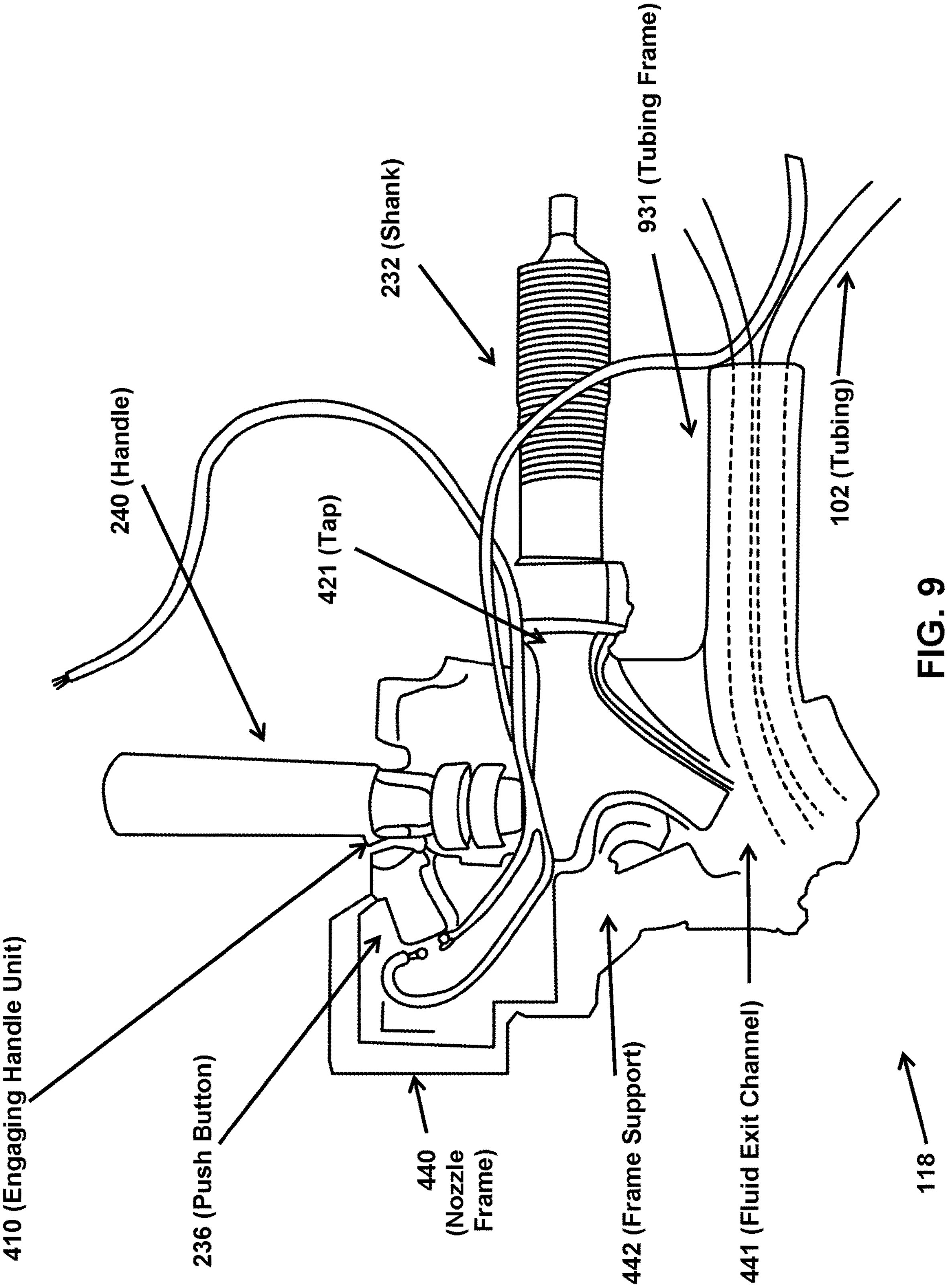
FIG. 9 is an exploded side view of the dispenser, in accordance with one or more embodiments.

FIG. 4-9 illustrate additional detail related to dispenser 118. For example, FIG. 4 illustrates a first side view of dispenser 118. FIG. 4 is a left side view of dispenser 118. FIG. 4 illustrates a nozzle frame 440, a tap 421, and a tubing frame 431 in which both pressurized and/or non-pressurized beverage tubing 102 of system 100 (FIG. 1) may connect. Engaging handle unit 410 comprises handle 240 and push button 236 (e.g., one example part of sensor 230 described above. FIG. 4 also illustrates a fluid exit channel 441. FIG. 5 is an opposite side view of dispenser 118. For example, FIG. 5 is a right-side view. FIG. 5 illustrates nozzle frame 440, handle 240, engaging handle unit 410, push button 236, tap 421, tubing frame 431 and fluid exit channel 441. FIG. 6 is an upper perspective view of dispenser 118. FIG. 6 provides a better view of the fluid exit channel 441. This is the view a user would have when pulling handle 240 for dispensing a beverage. FIG. 7 is an exploded upper perspective view of dispenser 118. FIG. 7 is illustrated from a perspective looking into nozzle frame 440 from the side to display components of dispenser 118 that are inside nozzle frame 440. FIG. 7 clearly depicts push button 236 to provide a better understanding of one possible example of mechanics behind engaging handle unit 410. FIG. 8 is a lower perspective view of dispenser 118. FIG. 8 illustrates the bottom of nozzle frame 440. This view provides a depiction of fluid exit channel 441, for example. FIG. 9 is an exploded side view of dispenser 118. FIG. 9 shows an image of nozzle frame 440 and enclosed components. FIG. 9 also depicts images of a shank 232 and beverage tubing 102 associated with a low-pressure component of the system (described below).

Figure 10:
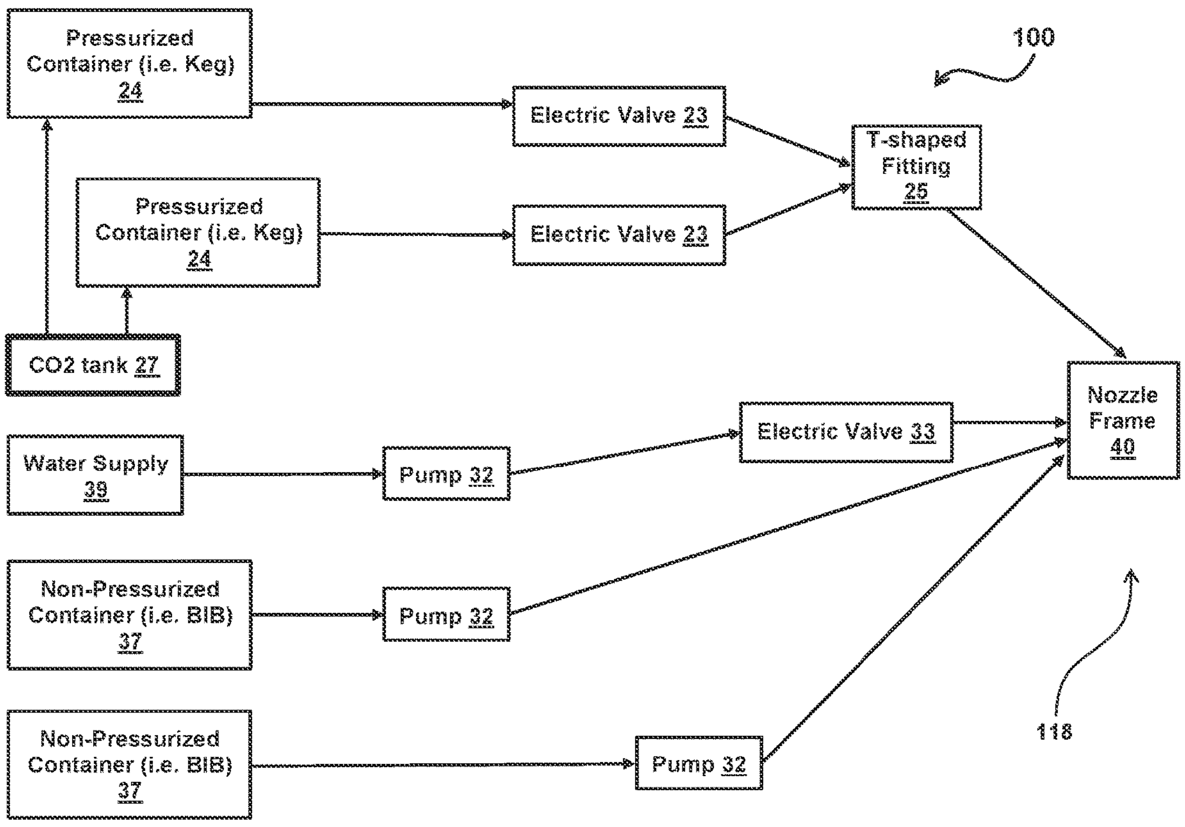
FIG. 10 is a block diagram schematically illustrating various sub-components of the system, in accordance with one or more embodiments.
Figure 11:
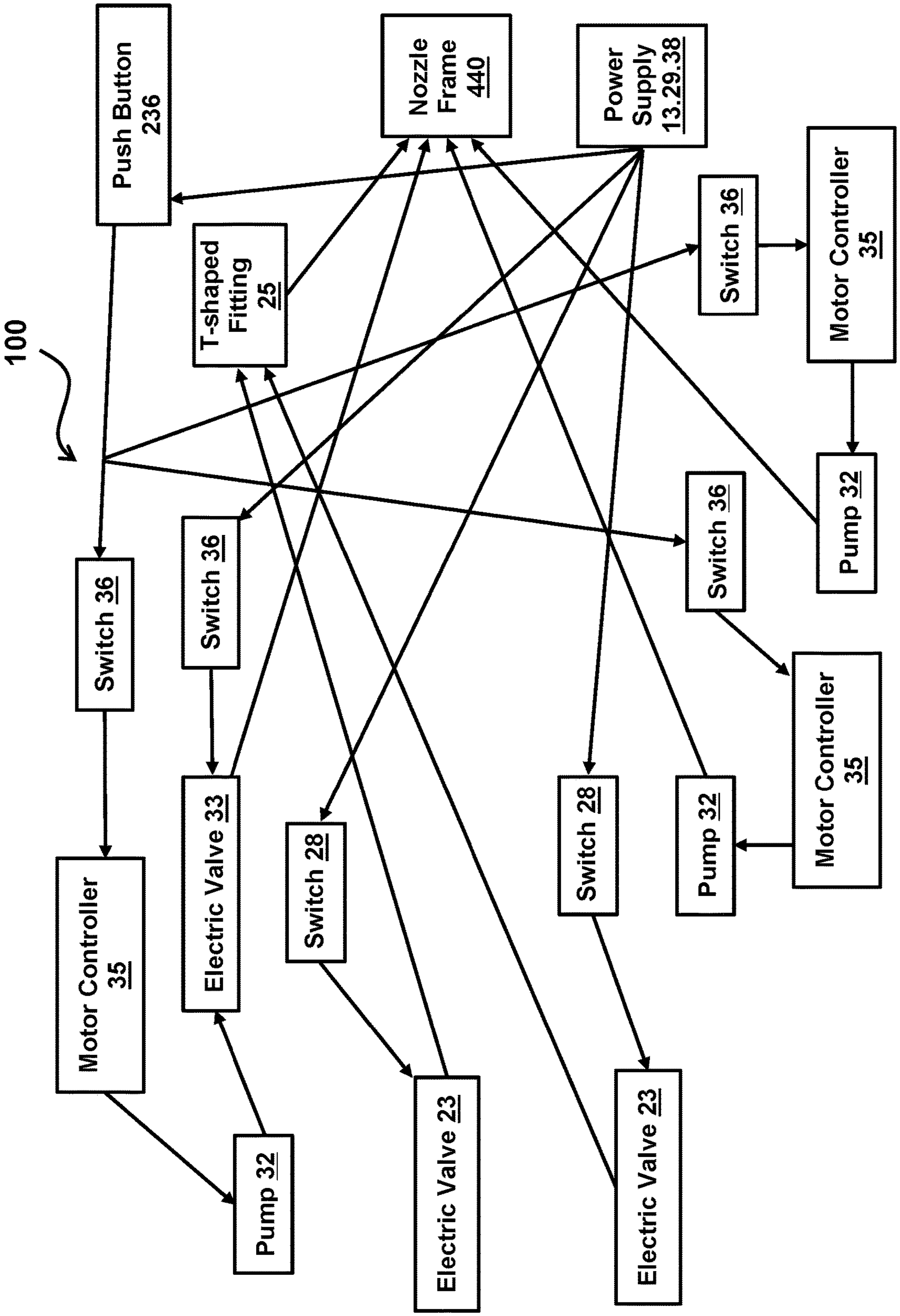
FIG. 11 is a block diagram illustrating electrical components of the system, in accordance with one or more embodiments.
Figure 12:
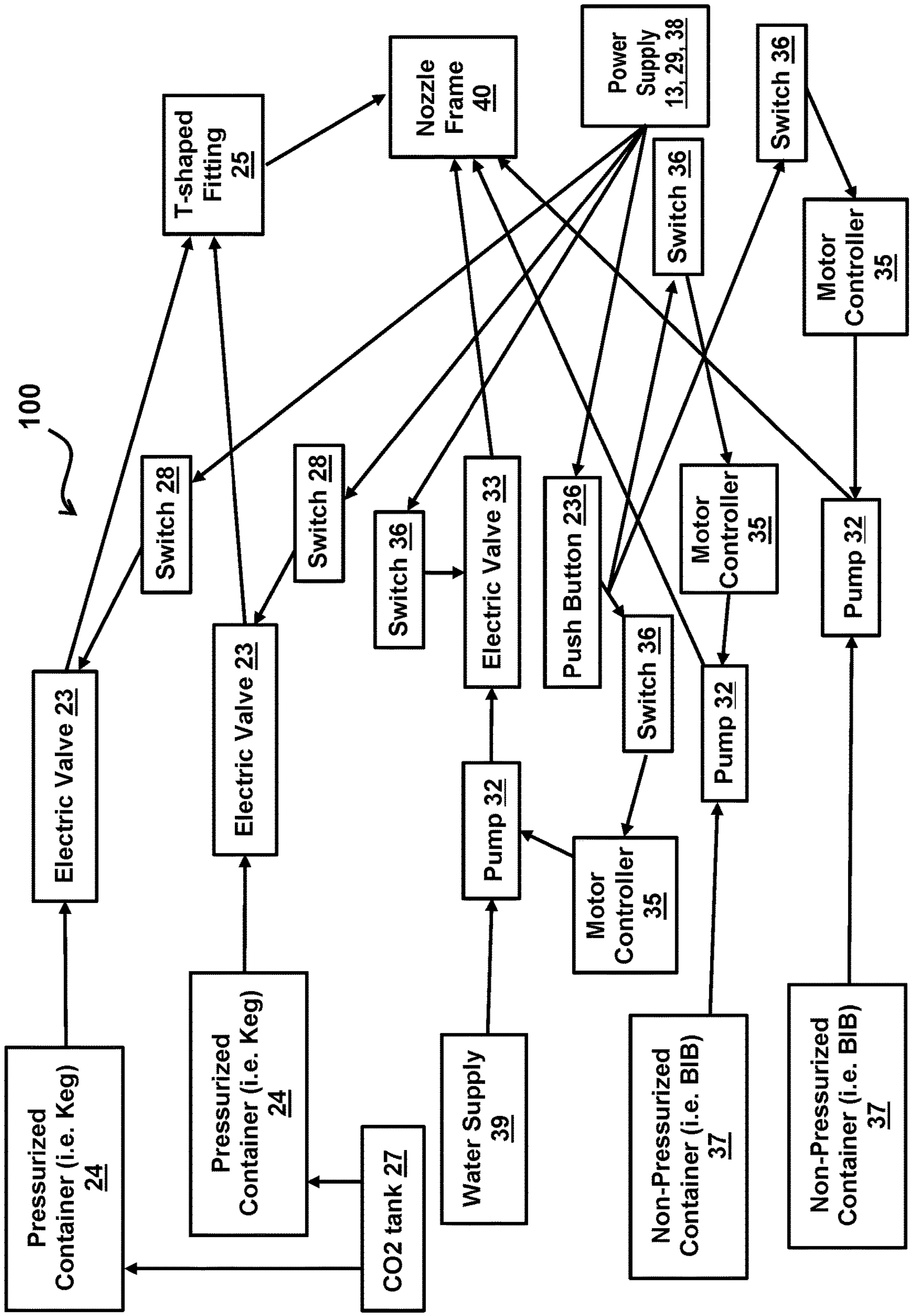
FIG. 12 is a block diagram illustrating the overall operation of the system, which includes flow of both the electrical and fluid operations for multiple pressurized and non-pressurized beverages, in accordance with one or more embodiments.
Figure 13:
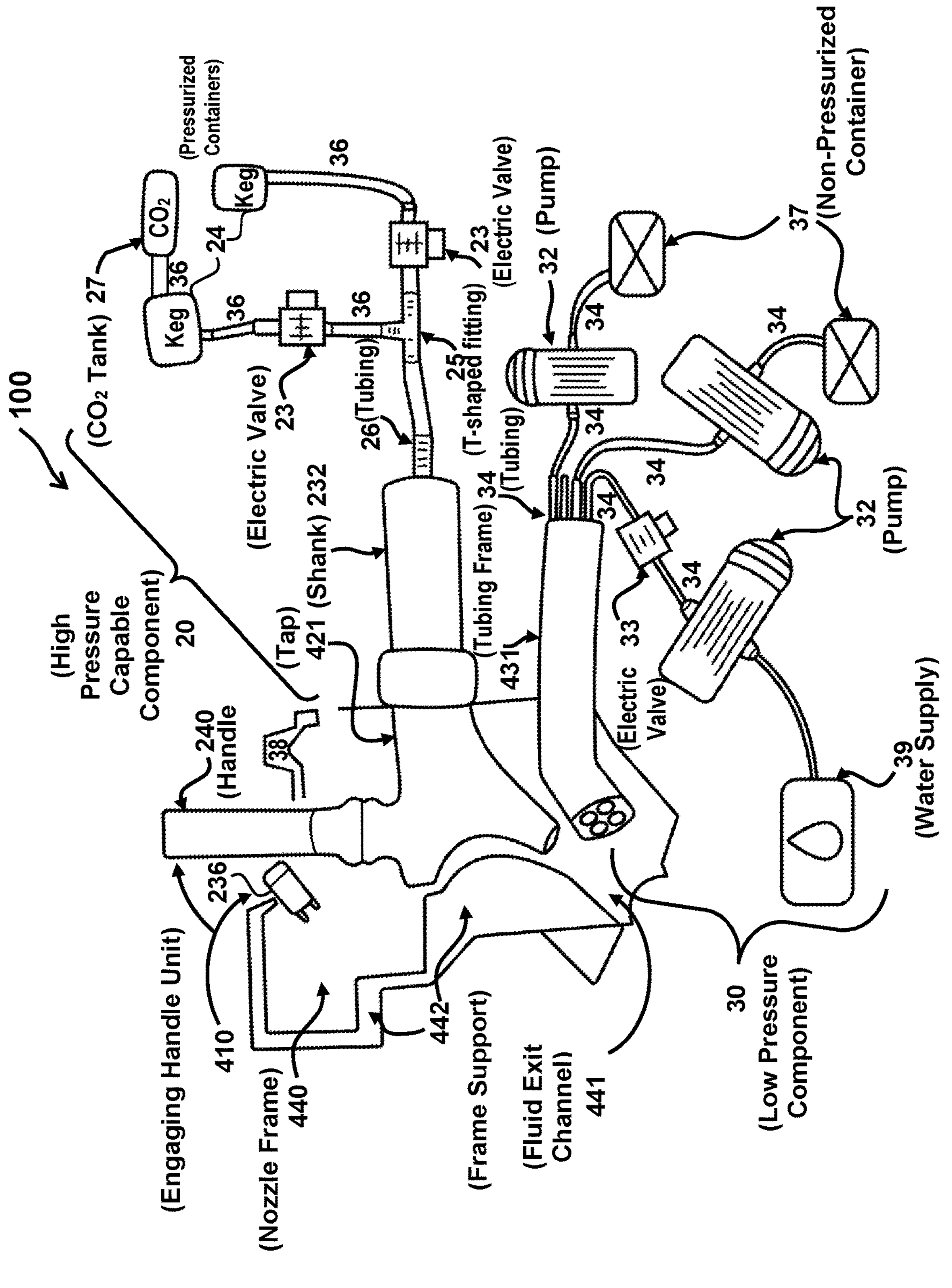
FIG. 13 illustrates an alternate version of the system, having pressurized and non-pressurized sub-systems, in accordance with one or more embodiments.
Figure 14:
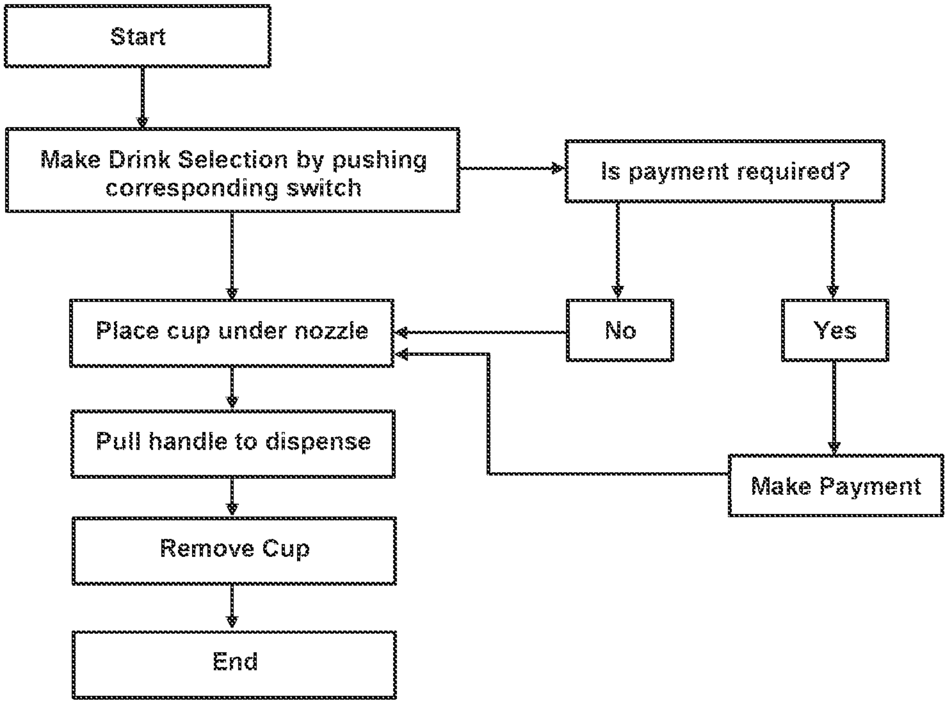
FIG. 14 is a block diagram illustrating aspects of a user's experience when operating the system, in accordance with one or more embodiments.
Figure 15:
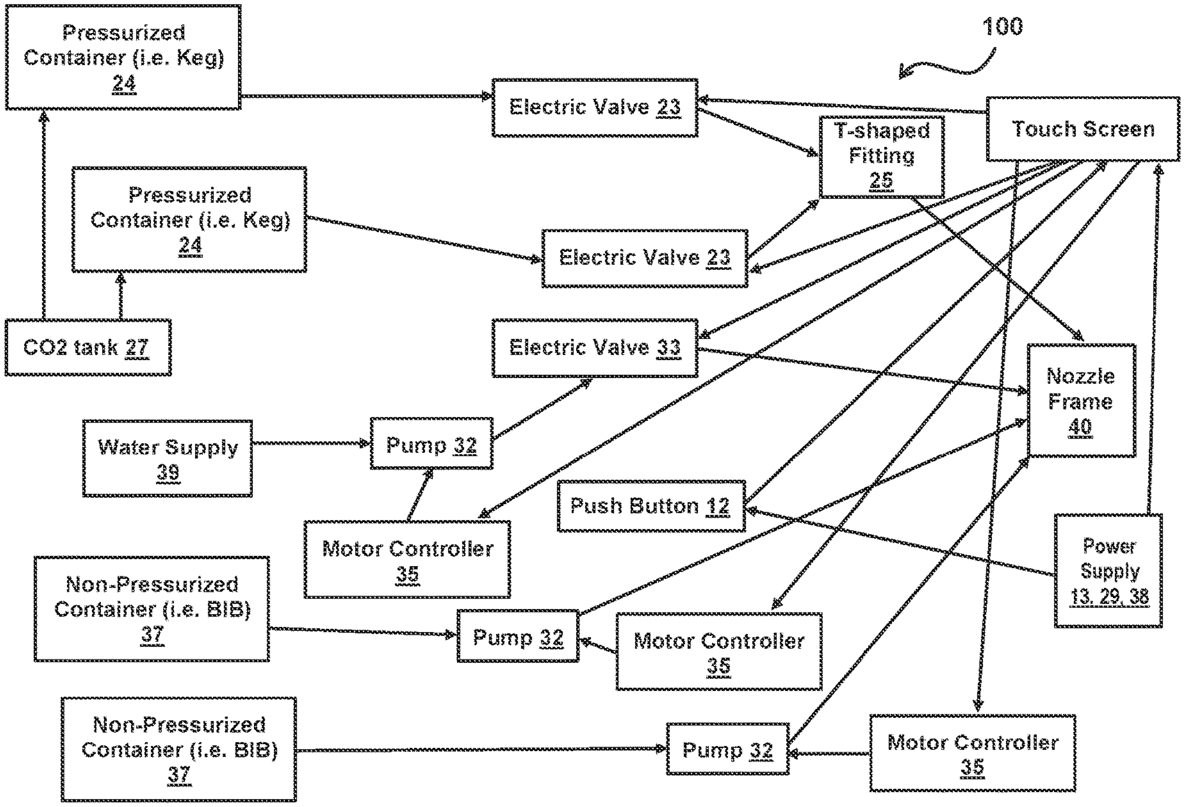
FIG. 15 displays an alternative variation of the system shown in FIG. 11 and FIG. 12, including a touch screen instead of switches, in accordance with one or more embodiments.

FIG. 10-15 illustrate various other functional aspects of system 100. For example, FIG. 10 is a block diagram schematically illustrating various sub-components of system 100. FIG. 10 is a block diagram depicting how fluids may flow through nozzle frame 440 (and dispenser 118). FIG. 10 illustrates example flow for multiple pressurized and non-pressurized beverages. FIG. 11 is a block diagram illustrating various sub-components of system 100. FIG. 11 is a block diagram of electrical components of system 100. FIG. 12 is a block diagram illustrating system 100. FIG. 12 shows the block diagram for the overall operation of system 100, which includes flow of both the electrical and fluid operations for multiple pressurized and non-pressurized beverages. FIG. 13 illustrates an alternate version of system 100, having pressurized and non-pressurized sub-systems. FIG. 14 is a block diagram illustrating aspects of a user's experience when operating system 100. FIG. 15 displays an alternative variation of system 100 shown in FIG. 11 and FIG. 12, including a touch screen (e.g., a display as described above) instead of switches.

Engaging Handle Unit

Engaging handle unit 410 is an elongated structure configured to couple to any variation of a tap 421. Engaging handle unit 410 may vary in shape and size. Engaging handle unit 410 allows a user to pull (or otherwise actuate) handle 240 into some engagement and/or disengagement with a push button 236, a latch 238, and/or other component of sensor 230 (FIG. 2). The bottom end of the engaging handle unit 410 may be connected to a high-pressure capable component of system 100 (e.g., a component coupled to a pressurized keg of beer, for example). Engaging handle unit 410 may be configured to allow a user to alternate between multiple pressurized (e.g., beer kegs) and non-pressurized portions of system 100. In some embodiments, engaging handle unit 410 comprises a push button 236 (or latch as described above) coupled to or configured to be actuated by handle 240 that is directly connected to a tap 421, from which pressurized beverages (e.g., beer) may exit. The push button 236 may operate as a "push to dispense" feature for any non-pressurized fluids, where the action of pulling the handle 240 alone operates as a way to dispense the pressurized fluids through tap 421. When any non-pressurized fluid's switches 36 (FIG. 11) are switched on, push button 236 may send a signal to a pump 32 (FIG. 10, FIG. 11) (associated with a non-pressurized beverage) to begin pumping.

Push button 236 (and/or a latch) may be integrated into nozzle frame 440 and attached to handle 240 in a way that allows for the pulling (or pushing) of handle 240 to push the push button 236 on (or latch on the latch), and activate dispensing. This process can be seen in FIGS. 7 and 9, where FIG. 7 shows handle 240 pulled forward, thus pushing the push button 236 (in this example) on, whereas FIG. 9 shows handle 240 in a position where it is not being pulled forward and push button 236 remains off. As seen in FIG. 11, push button 236 allows for a pass of electricity from a power supply (which may also be in included in system 100) 13, 29, 38 to a switch 28 that turns on and off a pump 32 (which may be similar to and/or the same as pump 294 described above) connected to a flushing fluid (e.g., water in this example) supply 39. Potential non-limiting variations of engaging handle unit 410 include the use of some other electronic sensor instead of push button 236 (e.g., as described above). In some embodiments, an alternate sensor would work in the sense of whenever handle 240 is pulled forward or pushed back the sensor is triggered and would then send signal to the corresponding components of system 100 (e.g., controller 120 shown in FIG. 1). Another variation could be the use of a switch and/or a latch in place of push button 236. This switch or latch would work as it could be switched on when handle 240 is pulled down or pushed back and switched off when the handle is released or pushed back to its original position.

High Pressure Capable Component

A high pressure capable portion 20 of system 100 comprises tap 421 or a similar valve, shank 232, and/or other components, and has the ability to connect to a pressurized system such as a pressurized beer keg (as shown in FIG. 1 and FIG. 2). The high pressure capable portion is configured to allow for the passage of fluid to flow out of tap 421 when desired. The high pressure capable portion may be coupled to nozzle frame 440 by both sides of nozzle frame 440 encasing tap 421. High pressure capable component 20 comprises components described above that control the exit of flow from multiple pressurized containers 24 (e.g., similar to and/or the same as beverage sources 112, 271, and/or 273 shown in FIG. 2) to a single nozzle frame 440. This includes tap 421 that is integrated into nozzle frame 440 and attached to engaging handle unit 410 as seen in FIG. 5. Tap 421 is coupled to shank 232 or a structure capable of attaching a tap directly to tubing 26 (which may be similar to and/or the same as beverage tubing 102 described above). FIG. 9 depicts tap 421 and shank 232 attached to nozzle frame 440. This shank 232 allows for tubing 26 to connect a T-shaped fitting 25 (similar to and/or the same as 291, 292, 295 described above) used to split tubing to multiple branches. Each tube 26 connects to an electric valve 23 (similar to and/or the same as valves 108, 114, 280, 282, 204, 250, etc., described above) that when switched on allows for fluid to pass from pressurized containers 24 to the tap 421. The pressurized containers 24 remain pressurized by the addition of carbon dioxide from a C02 tank 27 (e.g., as also shown in FIG. 2). (See the top half of FIG. 12 for a depiction of the high pressure capable component 20). The electric valves 23 work by allowing for the passage of fluid only when current is passing through them via the power supply 13, 29, 39 (as actuated by controller 120 shown in FIG. 1 and described above). When coupled to switches 28, these electric valves 23 will hold back the fluid from the pressurized containers 24 until they are switched to the "on" position. This allows for control over which line of fluid will exit through the tap 421 when handle 240 is actuated. FIG. 13 provides an overall flowchart for system 100. Components of system 100 shown in FIG. 13 are similar to and/or the same as the components of system 100 shown in FIG. 2, but may be arranged differently, for example.

Variations of the high pressure capable component 20 of system 100 include the use of a different fitting in replacement of the t-shaped fitting 25. The t-shaped fitting 25 (and the other similar fittings described above) refers to a fitting that allows for a three-way tubing connection and was used to show the flow through two pressurized containers 24. (See FIG. 13 for a depiction of the t-shaped fitting 25). System 100 is capable of working with a large quantity of pressurized containers 24, therefore any fitting that involves more than three connections could be used in the place of t-shaped fitting 25. Another variation may comprise a modification of the shank 232 itself. A modification to add more tubing 26 connections directly to shank 232 would bypass the need for a t-shaped fitting 25 or any other fitting used for three or more tubing 26 connections.

Low Pressure Component

A low pressure component 30 of system 100 may comprise multiple tubes 34 (similar to and/or the same as beverage tubing 102 described above) coupled together by a tubing frame 31. Tubing 34 has the ability to connect to a low pressurized system. The function of the low pressure component 30 is to allow for the passage of fluid through the fluid exit channel 441 of the nozzle frame. The low pressure component 30 may be connected to the nozzle frame 440 by both sides of the nozzle frame 40 encasing the tubing frame 31, for example.

The low pressure component 30 comprises elements of system 100 that control flow from multiple non-pressurized sources to a single nozzle. These sources may include non-pressurized containers 37 and a water supply 39 that can be supplied directly from a water line or a portable water filled non-pressurized container 37, for example. Through the use of pumps 32, flow from the non-pressurized containers is pumped to the tubing frame 431 via tubing 34 connections. The bottom half of FIG. 10 shows this process, for example. The tubing frame 31 comprises a plastic structure designed to hold the low pressure component 30 tubing together. It functions as a way to allow fluid to exit the nozzle frame 440 through the fluid exit channel 441 as seen in FIG. 8. In some embodiments, pumps 32 (which may be similar to and/or the same as the pump shown in FIG. 2 and described above) are coupled to motor controllers 35 configured for adjusting the speed of flow through the pumps 32. These motor controllers 35 are also connected to switches 36 with power being supplied through the power supply 13, 29, 38. This is to allow for the pumps 32 to operate when the corresponding switch 36 is on. The pumps, even when switched on, rely on the handle 240 actuating the sensor (e.g. push button 236 to operate). This can be seen by the block diagram shown in FIG. 12. The water supply 39 from either a supply line or non-pressurized container 37 can be coupled directly to a pump 32. The pump 32 pumps water through an electric valve 33 that is wired to a switch 36 for a turn off/turn on function as seen in the bottom half of FIG. 12. Tubing 34 from the electric valve 33 runs to the tubing frame 31 where fluid may exit through the fluid exit channel 441 as shown in FIG. 13.

Possible variations include the use of a different material for the tubing frame 431. For example, the tubing frame 431 can be made with various materials such as metal or types of ceramic. The number of possible tubes 34 that can fit into the fluid exit chamber 441 is also not limited to the size of the tubing frame 431 as fittings of different sizes can attach to the tubing 34 just outside the tubing frame 431. FIG. depicts tubing 34 outside tubing frame 431.

Nozzle Frame

Nozzle frame 440 is structured to allow for push button 236, tap 421, and tubing frame 31 to fit inside firmly. Holes of the top of the nozzle frame 440 allow for the handle 240 to be secured to tap 421. Variations in the shape may be utilized. The function of the nozzle frame 440 is to allow for fluid to exit the systems through the fluid exit channel 441. The nozzle frame 440 is connected to the engaging handle unit 410, high pressure capable component 20, and the low pressure component 30 as it secures many elements of system 100 together. The nozzle frame 440 comprises a plastic frame designed to hold together the engaging handle unit 410, tap 421 from the high pressure capable component 20 and the tubing frame 31 from the low pressure component 30 as seen in FIG. 4. The nozzle frame 440 has areas of support 442 or pieces of plastic that ensure the elements are securely packed together as shown in FIG. 7. The nozzle frame 440 has an area at the bottom of the structure labeled the fluid exit channel 441 as seen in FIG. 6. The fluid exit channel 441 is the area of the nozzle frame 440 that allows for fluid to exit the nozzle frame 440 from both the tap 421 and the tubing 34 in the tubing frame 431. The nozzle frame 440 may be made of plastic, but various other materials may be made to replicate the basic function and structure of the element.

Connections of Main Elements and Sub-Elements of System

The nozzle frame 440 structure comprises areas of frame support 442 configured to hold various elements together securely. The nozzle frame 440 also comprises a hole for fluid to exit. This is known as the fluid exit channel 441. The nozzle frame 440 connects to the high pressure capable component 20, engaging handle unit 410, and low pressure component 30 by encasing the tap 421, push button 236, and tubing frame 431, respectfully. The tap 421 attaches to both the handle 240 and the shank 232. Connected to the shank 232 is the tubing 26 that leads to the t-shaped fitting 25. More tubing 26 from the t-shaped fitting 25 connects to the electric valve 23 which allows for tubing 26 to connect the pressured container 24. The pressurized containers are connected to a CO2 tank 27 via tubing 26. The electrical valves 23 are wired to switches 28 and all electrical components are wired to the power supply as seen in FIG. 11.

The nozzle frame's 440 connection to the tubing frame 431 leads to the attachment of the tubing 34 as seen in FIG. 9. The tubing 34 either directly connects to pumps 32 or the electric valve 33 followed by more tubing 34 connected to a pump 32. This is dependent on the kind of the fluid supply sent to the pumps 32 (i.e., the water supply requires the addition of an electric valve as seen in FIG. 13). The pumps 32 then connect to more tubing 34 which is connected to multiple non-pressurized containers 37 as well as a water supply 39. The pumps 32 are all electrically wired to a motor controller 35 as well as a switch 36 and all electrical pieces of equipment connect to the power supply 13, 29, 39 as seen in FIG. 11.

Figure 16:
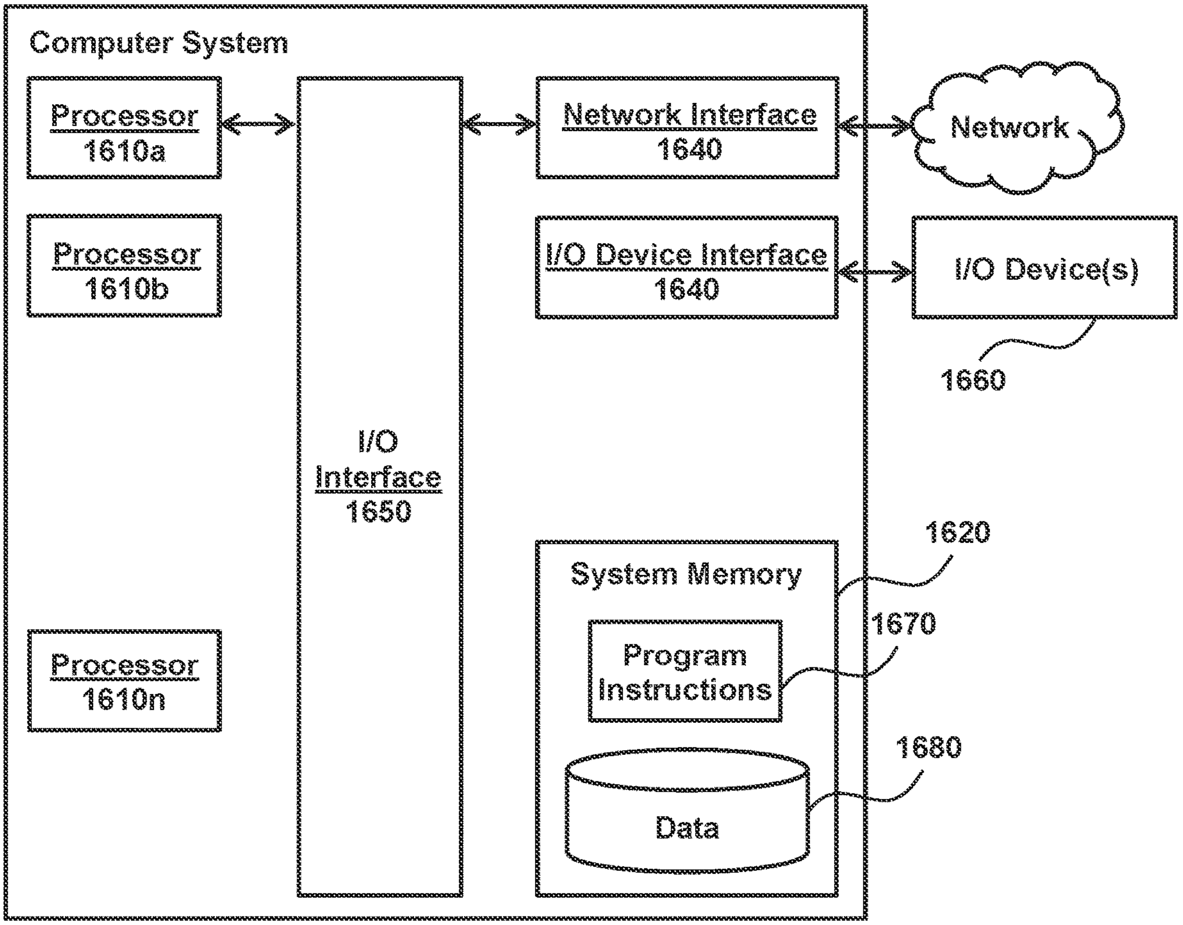
FIG. 16 is a diagram that illustrates an exemplary computing system in accordance with one or more embodiments.

FIG. 16 is a diagram that illustrates an exemplary computing system 1600 in accordance with embodiments of the present system. Various portions of systems and methods described herein, may include or be executed on one or more computer systems the same as or similar to computing system 1600. For example, controller 120, processor 314, server 326, mobile user device 334, desktop user device 338, external resources 346, and/or other components of system 100 (FIG. 1) may be and/or include one more computer systems the same as or similar to computing system 1600. Further, processes, modules, processor components, and/or other components of system 100 described herein may be executed by one or more processing systems similar to and/or the same as that of computing system 1600.

Computing system 1600 may include one or more processors (e.g., processors 1610*a*-1610*n*) coupled to system memory 1620, an input/output I/O device interface 1630, and a network interface 1640 via an input/output (I/O) interface 1650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1620). Computing system 1600 may be a uni-processor system including one processor (e.g., processor 1610*a*), or a multi-processor system including any number of suitable processors (e.g., 1610*a*-1610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1600 may include a plurality of computing devices (e.g., distributed computer systems) to implement various processing functions.

I/O device interface 1630 may provide an interface for connection of one or more I/O devices 1660 to computer system 1600. I/O devices may include devices that receive input (e.g., from a user) or output information (e.g., to a user). I/O devices 1660 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or other devices. I/O devices 1660 may be connected to computer system 1600 through a wired or wireless connection. I/O devices 1660 may be connected to computer system 1600 from a remote location. I/O devices 1660 located on a remote computer system, for example, may be connected to computer system 1600 via a network and network interface 1640.

Network interface 1640 may include a network adapter that provides for connection of computer system 1600 to a network. Network interface may 1640 may facilitate data exchange between computer system 1600 and other devices connected to the network. Network interface 1640 may support wired or wireless communication. The network may include an electronic communication network, such as the Internet, a local area network (LAN), a wide area network (WAN), a cellular communications network, or other networks.

System memory 1620 may be configured to store program instructions 1670 or data 1680. Program instructions 1670 may be executable by a processor (e.g., one or more of processors 1610*a*-1610*n*) to implement one or more embodiments of the present techniques. Instructions 1670 may include modules and/or components (e.g., machine readable instructions described above) of computer program instructions for implementing one or more techniques described herein with regard to various processing modules and/or components. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1620 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or other memory. System memory 1620 may include a non-transitory computer readable storage medium that may have program instructions stored thereon that are executable by a computer processor (e.g., one or more of processors 1610*a*-1610*n*) to cause the subject matter and the functional operations described herein. A memory (e.g., system memory 1620) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1650 may be configured to coordinate I/O traffic between processors 1610*a*-1610*n*, system memory 1620, network interface 1640, I/O devices 1660, and/or other peripheral devices. I/O interface 1650 may perform protocol, timing, or other data transformations to convert data signals from one component (e.g., system memory 1620) into a format suitable for use by another component (e.g., processors 1610*a*-1610*n*). I/O interface 1650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1600 or multiple computer systems 1600 configured to host different portions or instances of embodiments. Multiple computer systems 1600 may provide for parallel or sequential processing/execution of one or more portions of the techniques described herein.

Those skilled in the art will appreciate that computer system 1600 is merely illustrative and is not intended to limit the scope of the techniques described herein. Computer system 1600 may include any combination of devices or software that may perform or otherwise provide for the performance of the techniques described herein. For example, computer system 1600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a television or device connected to a television (e.g., Apple TV™), or a Global Positioning System (GPS), or other devices. Computer system 1600 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1600 may be transmitted to computer system 1600 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

Figure 17:
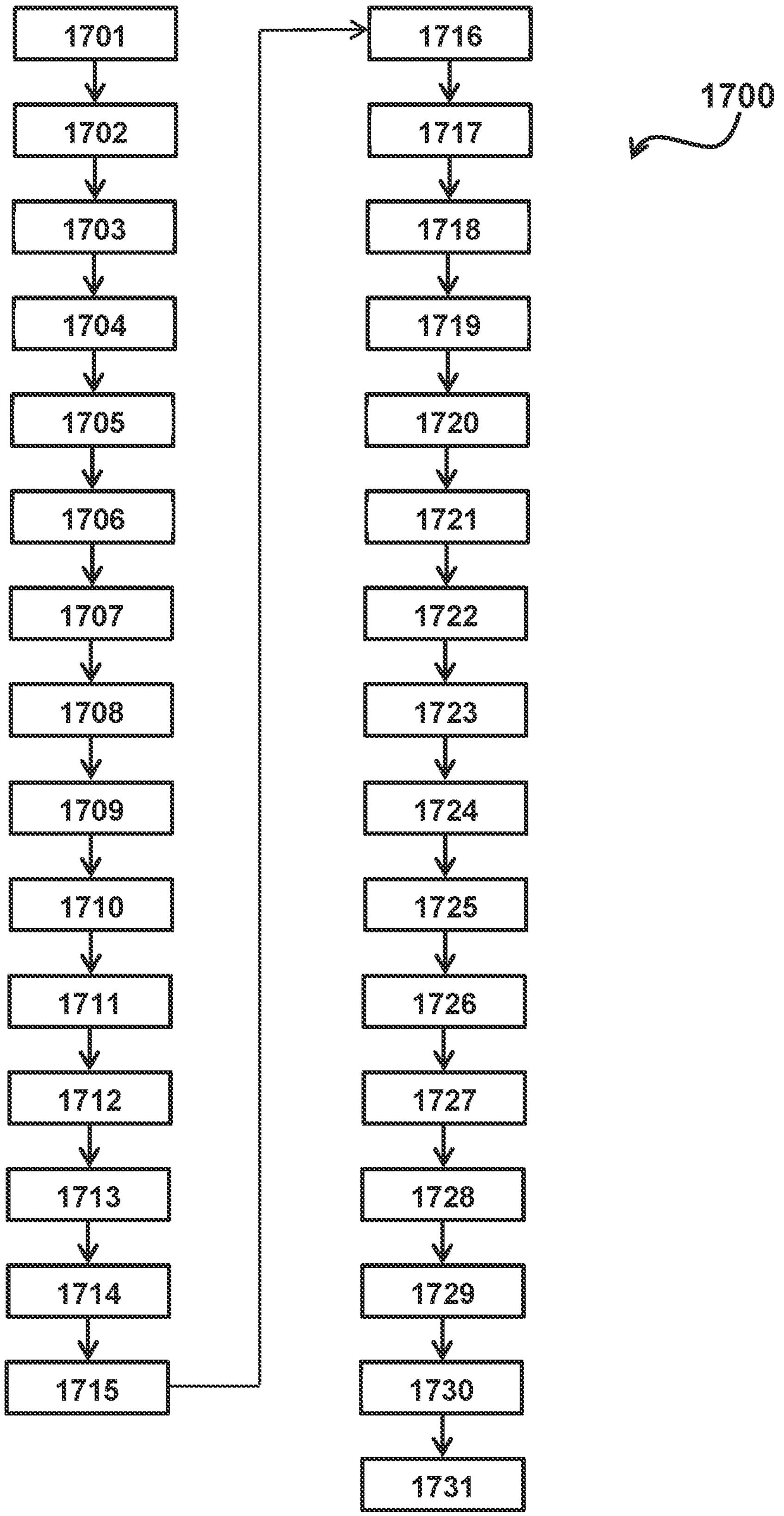
FIG. 17 illustrates a method for automated flushing of a system for beverage dispensing, in accordance with one or more embodiments.

FIG. 17 illustrates a method 1700 for automated flushing of a system for beverage dispensing. Method 1700 may be executed by a system such as system 100 and/or other systems. The operations of method 1700 presented below are intended to be illustrative. In some embodiments, method 1700 may be accomplished with one or more additional operations not described, and/or without one or more of the operations discussed. Additionally, the order in which the operations of method 1700 are illustrated in FIG. 17 and described below is not intended to be limiting.

In some embodiments, method 1700 may be implemented, at least in part, in one or more processing devices such as controller 120 described herein (FIG. 1, and can include, e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1700 in response to instructions (e.g., machine readable instructions) stored electronically on an electronic storage medium. The one or more processing devices may include one or more devices configured through hardware, firmware, and/or software to be specifically designed for execution of one or more of the operations of method 1700.

At operation 1701, system 100 is turned on (e.g., via a power switch on controller 120 and/or one or more other components of system 100). A "start" page may be displayed on a display associated with system 100 (e.g., provided by controller 120, computing system 1600, a portable computing device (FIG. 3), a desktop computing device (FIG. 3), etc.). At operations 1702 and 1703, a flushing fluid valve (e.g., see valve 108 in FIG. 1) and a drain valve (e.g., see the drain valve shown in FIG. 2) opened or turned on, and beverage lines of system 100 are filled with flushing fluid (operation 1704). Once filled, the drain valve is closed or turned off (operation 1705).

At operation 1706, a terminal (e.g., a portable computing device (FIG. 3), a desktop computing device (FIG. 3), etc.) of controller 120 is placed into an RFID tag read mode, and at operation 1707, an RFID (associated with a user) tag is scanned (and determined to be valid by controller 120. A first beverage (e.g., a beer) is selected (operation 1710) and the selection is displayed back to the user (operation 1711) by the terminal, for example. A hold may be placed (by controller 120) on a credit card associated with the user (operation 1712) to verify the card is valid and is able to cover the cost of the selected beverage. At operation 1713, the credit cart is scanned for eventual charging.

At operation 1714, the flushing fluid valve is closed (by controller 120) and the drain valve is opened (operation 1715) (by controller 120), and after a wait of some predetermined amount of time (operation 1716), the beverage valve (see valve 114 in FIG. 1) is opened or turned on (operation 1717) (by controller 120) to cause the beverage to flow from the selected beverage source. At operation 1718, a flow rate of the beverage is measured (e.g., as described above). The drain valve is turned off and a begin pouring page is displayed to the user on a display associated with system 100 (e.g., provided by controller 120, computing system 1600, a portable computing device (FIG. 3), a desktop computing device (FIG. 3), etc.). At operation 1721, the dispenser (see dispenser 118 in FIG. 1) is actuated to dispense the beverage, and a sensor associated with the dispenser begins timing a length of the pour (operation 1722). The dispenser is actuated to stop dispensing the beverage (operation 1723) and the timer is stopped (operation 1724).

Controller 120 calculates (operation 1724) a total amount of beverage poured based on the flow rate, the elapsed time, and/or other information. Controller also calculates an amount to be charged to the credit card (operation 1725) based on a price of the beverage and the total amount of beverage poured. The total amount to charge is sent to the terminal (operation 1726), which displays (operation 1727) a receipt page.

Controller 120 turns the drain valve on (operation 1728), and the flushing fluid valve on (operation 1729) to flush the beverage tubing with flushing fluid, then turns the drain valve off (operation 1730) to hold the flushing fluid in the beverage tubing. The "start" page can then be displayed to the user once again (operation 1731).

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to cost constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and other terms, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and other similar statements (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or similar terms refer to actions or processes of a specific apparatus, such as a special purpose computer or a similar special purpose electronic processing/computing device.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Various embodiments are disclosed in the subsequent list of numbered clauses:

1. An automated flushing system for beverage dispensing, the system comprising: beverage tubing, the beverage tubing comprising: a first branch configured to couple with a first flushing fluid supply, the first branch comprising a first valve configured to control a flow of first flushing fluid from the first flushing fluid supply; and a second branch configured to couple with a beverage source, the second branch comprising a second valve configured to control a flow of beverage from the beverage source; a dispenser coupled to the beverage tubing downstream from the first branch and the second branch, the dispenser configured to dispense the beverage to a user; and a controller operatively coupled to the first valve, the second valve, and the dispenser, the controller configured to: open the first valve to fill the beverage tubing with the first flushing fluid; close the first valve and open the second valve so that beverage flows from the beverage source; determine that beverage has flowed to the dispenser based on a pressure of the beverage source, and/or a length of beverage tubing between the beverage source and the dispenser to facilitate dispensing of beverage through the dispenser; and responsive to completion of beverage dispensing, close the second valve and open the first valve to re-fill the beverage tubing with the first flushing fluid from the first flushing fluid supply.

2. The system of clause 1, wherein the first flushing fluid is water and/or carbon dioxide (CO2).

3. The system of any of the previous clauses, further comprising a third branch of the beverage tubing configured to couple with a second flushing fluid supply, the third branch comprising a third valve configured to control a flow of second flushing fluid from the second flushing fluid supply.

4. The system of any of the previous clauses, wherein the controller is operatively coupled to the first valve, the second valve, the dispenser, and the third valve, the controller configured to, responsive to completion of beverage dispensing, close the second valve and open the first valve to re-fill the beverage tubing with the first flushing fluid from the first flushing fluid supply, then close the first valve and open the third valve to fill the beverage tubing with the second flushing fluid from the second flushing fluid supply.

5. The system of any of the previous clauses, wherein the first flushing fluid is water and the second flushing fluid is CO2.

6. The system of any of the previous clauses, wherein the dispenser is a trigger tap, and wherein the trigger tap is configured to release at least some of the first flushing fluid while the trigger tap is in a closed position.

7. The system of any of the previous clauses, wherein the first flushing fluid supply is pressurized.

8. The system of any of the previous clauses, further comprising: a flow meter coupled to the beverage tubing downstream from the dispenser such that beverage flowing through the beverage tubing passes the dispenser before contacting the flow meter; wherein the controller is operatively coupled to the first valve, the second valve, and the dispenser, and the flow meter, the controller configured to: open the first valve to fill the beverage tubing with the first flushing fluid; close the first valve, and open the second valve so that beverage flows from the beverage source, past the dispenser, to the flow meter; determine that beverage is flowing through the flow meter based on a pressure of the beverage source, and/or a length of beverage tubing between the beverage source and the flow meter; and determine a flow rate for the beverage based on one or more output signals from the flow meter; facilitate dispensing of beverage through the dispenser; and responsive to completion of beverage dispensing, close the second valve, and open the first valve, to re-fill the beverage tubing with the first flushing fluid from the first flushing fluid supply.

9. The system of any of the previous clauses, wherein the dispenser comprises a sensor configured to generate one or more output signals indicating that beverage is being dispensed through the dispenser, wherein the controller is operatively coupled to the sensor, and wherein the controller is configured to determine an amount of beverage dispensed through the dispenser based on the one or more output signals from the sensor, and/or the one or more output signals from the flow meter.

10. The system of any of the previous clauses, wherein the sensor comprises a button and/or a latch configured to indicate when a handle of the dispenser is moved from a closed position to an open position or vice versa.

11. The system of any of the previous clauses, wherein the controller is configured to determine a cost of the beverage dispensed through the dispenser based on the amount of beverage dispensed through the dispenser.

12. The system of any of the previous clauses, further comprising: a drain valve coupled to the beverage tubing and configured to control a flow of first flushing liquid and/or beverage to a drain; wherein the controller is operatively coupled to the first valve, the second valve, the dispenser, and the drain valve, the controller configured to: open the first valve and the drain valve to fill the beverage tubing with flushing fluid, and close the drain valve once the beverage tubing is filled with flushing fluid; close the first valve, open the drain valve, and open the second valve so that beverage flows from the beverage source, past the dispenser, to the drain; close the drain valve to facilitate dispensing of beverage through the dispenser; and responsive to completion of beverage dispensing, close the second valve, open the first valve, and open the drain valve to re-fill the beverage tubing with the first flushing fluid from the first flushing fluid supply, and close the drain valve.

13. The system of any of the previous clauses, further comprising one or more additional parallel second branches of the beverage tubing configured to couple with one or more additional parallel second beverage sources, the one or more additional parallel second branches each comprising an additional valve configured to control a flow of beverage from a respective beverage source.

14. The system of any of the previous clauses, wherein the controller is configured to, responsive to completion of beverage dispensing from any of the one or more additional parallel second beverage sources, close the additional valve, and open the first valve, to re-fill the beverage tubing with the first flushing fluid from the first flushing fluid supply.

15. The system of any of the previous clauses, wherein the controller is configured to control flow from a respective beverage source based on user selection of that beverage source.

16. The system of any of the previous clauses, further comprising a user interface operatively coupled to the controller, the user interface configured to receive information from and provide information to the user.

17. The system of any of the previous clauses, wherein the information received from, or provided to, the user comprises: a radio frequency identification (RFID) associated with the user; user credit card information; a beverage menu comprising one or more additional parallel beverages for selection by the user; an instruction to begin pouring a given beverage once a flow rate for the given beverage has been determined; a charge for an amount of beverage dispensed; and/or a receipt for the charged amount.

18. The system of any of the previous clauses, wherein the first valve is a electric solenoid valve.

19. The system of any of the previous clauses, wherein the second valve is an electric motorized ball valve.

20. The system of any of the previous clauses, wherein the first branch comprises a one way check valve configured to prevent back flow to the first flushing fluid supply, and is coupled to the second branch by a three way tube tee.

21. The system of any of the previous clauses, wherein the second branch is coupled to the first branch by a three way tube tee so that the beverage and the first flushing fluid can both flow toward the dispenser.

22. The system of any of the previous clauses, wherein the dispenser is coupled to the beverage tubing by a three way tube tee, with a one way check valve along the beverage tubing on a downstream side of the three way tube tee.

23. The system of any of the previous clauses, further comprising a pump coupled to the beverage tubing downstream from the dispenser.

24. The system of any of the previous clauses, wherein the pump is operatively coupled to the controller, and wherein the pump is configured to be actuated if necessary by the controller to pump the first flushing fluid and/or the beverage through the beverage tubing.

25. The system of any of the previous clauses, wherein the beverage is beer, and the beverage source is a keg of the beer.

26. A method for automated flushing of a system for beverage dispensing, the method comprising: providing beverage tubing, the beverage tubing comprising: a first branch configured to couple with a first flushing fluid supply, the first branch comprising a first valve configured to control a flow of first flushing fluid from the first flushing fluid supply; and a second branch configured to couple with a beverage source, the second branch comprising a second valve configured to control a flow of beverage from the beverage source; coupling a dispenser to the beverage tubing downstream from the first branch and the second branch, the dispenser configured to dispense the beverage to a user; operatively coupling a controller to the first valve, the second valve, and the dispenser; opening, with the controller, the first valve to fill the beverage tubing with the first flushing fluid; closing, with the controller, the first valve and open the second valve so that beverage flows from the beverage source; determining, with the controller, that beverage has flowed to the dispenser based on a pressure of the beverage source, and/or a length of beverage tubing between the beverage source and the dispenser to facilitate dispensing of beverage through the dispenser; and responsive to completion of beverage dispensing, closing, with the controller, the second valve and open the first valve to re-fill the beverage tubing with the first flushing fluid from the first flushing fluid supply.

27. The method of clause 26, wherein the first flushing fluid is water and/or carbon dioxide (CO2).

28. The method of any of the previous clauses, further comprising providing a third branch of the beverage tubing configured to couple with a second flushing fluid supply, the third branch comprising a third valve configured to control a flow of second flushing fluid from the second flushing fluid supply.

29. The method of any of the previous clauses, wherein the controller is operatively coupled to the first valve, the second valve, the dispenser, and the third valve, the controller configured to, responsive to completion of beverage dispensing, close the second valve and open the first valve to re-fill the beverage tubing with the first flushing fluid from the first flushing fluid supply, then close the first valve and open the third valve to fill the beverage tubing with the second flushing fluid from the second flushing fluid supply.

30. The method of any of the previous clauses, wherein the first flushing fluid is water and the second flushing fluid is CO2.

31. The method of any of the previous clauses, wherein the dispenser is a trigger tap, and wherein the trigger tap is configured to release at least some of the first flushing fluid while the trigger tap is in a closed position.

32. The method of any of the previous clauses, wherein the first flushing fluid supply is pressurized.

33. The method of any of the previous clauses, further comprising: coupling a flow meter to the beverage tubing downstream from the dispenser such that beverage flowing through the beverage tubing passes the dispenser before contacting the flow meter, wherein the controller is operatively coupled to the first valve, the second valve, and the dispenser, and the flow meter; opening, with the controller, the first valve to fill the beverage tubing with the first flushing fluid; closing, with the controller, the first valve, and opening the second valve so that beverage flows from the beverage source, past the dispenser, to the flow meter; determining, with the controller, that beverage is flowing through the flow meter based on a pressure of the beverage source, and/or a length of beverage tubing between the beverage source and the flow meter; and determining a flow rate for the beverage based on one or more output signals from the flow meter; facilitating, with the dispenser, dispensing of beverage through the dispenser; and responsive to completion of beverage dispensing, closing the second valve, and opening the first valve, to re-fill the beverage tubing with the first flushing fluid from the first flushing fluid supply.

34. The method of any of the previous clauses, wherein the dispenser comprises a sensor configured to generate one or more output signals indicating that beverage is being dispensed through the dispenser, wherein the controller is operatively coupled to the sensor, and wherein the controller is configured to determine an amount of beverage dispensed through the dispenser based on the one or more output signals from the sensor, and/or the one or more output signals from the flow meter.

35. The method of any of the previous clauses, wherein the sensor comprises a button and/or a latch configured to indicate when a handle of the dispenser is moved from a closed position to an open position or vice versa.

36. The method of any of the previous clauses, wherein the controller is configured to determine a cost of the beverage dispensed through the dispenser based on the amount of beverage dispensed through the dispenser.

37. The method of any of the previous clauses, further comprising: coupling a drain valve coupled to the beverage tubing and controlling a flow of first flushing liquid and/or beverage to a drain; wherein the controller is operatively coupled to the first valve, the second valve, the dispenser, and the drain valve, the controller configured to: open the first valve and the drain valve to fill the beverage tubing with flushing fluid, and close the drain valve once the beverage tubing is filled with flushing fluid; close the first valve, open the drain valve, and open the second valve so that beverage flows from the beverage source, past the dispenser, to the drain; close the drain valve to facilitate dispensing of beverage through the dispenser; and responsive to completion of beverage dispensing, close the second valve, open the first valve, and open the drain valve to re-fill the beverage tubing with the first flushing fluid from the first flushing fluid supply, and close the drain valve.

38. The method of any of the previous clauses, further comprising providing one or more additional parallel second branches of the beverage tubing configured to couple with one or more additional parallel second beverage sources, the one or more additional parallel second branches each comprising an additional valve configured to control a flow of beverage from a respective beverage source.

39. The method of any of the previous clauses, wherein the controller is configured to, responsive to completion of beverage dispensing from any of the one or more additional parallel second beverage sources, close the additional valve, and open the first valve, to re-fill the beverage tubing with the first flushing fluid from the first flushing fluid supply.

40. The method of any of the previous clauses, wherein the controller is configured to control flow from a respective beverage source based on user selection of that beverage source.

41. The method of any of the previous clauses, further comprising providing a user interface operatively coupled to the controller, the user interface configured to receive information from and provide information to the user.

42. The method of any of the previous clauses, wherein the information received from, or provided to, the user comprises: a radio frequency identification (RFID) associated with the user; user credit card information; a beverage menu comprising one or more additional parallel beverages for selection by the user; an instruction to begin pouring a given beverage once a flow rate for the given beverage has been determined; a charge for an amount of beverage dispensed; and/or a receipt for the charged amount.

43. The method of any of the previous clauses, wherein the first valve is an electric solenoid valve.

44. The method of any of the previous clauses, wherein the second valve is an electric motorized ball valve.

45. The method of any of the previous clauses, wherein the first branch comprises a one way check valve configured to prevent back flow to the first flushing fluid supply, and is coupled to the second branch by a three way tube tee.

46. The method of any of the previous clauses, wherein the second branch is coupled to the first branch by a three way tube tee so that the beverage and the first flushing fluid can both flow toward the dispenser.

47. The method of any of the previous clauses, wherein the dispenser is coupled to the beverage tubing by a three way tube tee, with a one way check valve along the beverage tubing on a downstream side of the three way tube tee.

48. The method of any of the previous clauses, further comprising providing a pump coupled to the beverage tubing downstream from the dispenser.

49. The method of any of the previous clauses, wherein the pump is operatively coupled to the controller, and wherein the pump is configured to be actuated if necessary by the controller to pump the first flushing fluid and/or the beverage through the beverage tubing.

50. The method of any of the previous clauses, wherein the beverage is beer, and the beverage source is a keg of the beer.

What is claimed is:

1. An automated flushing system for beverage dispensing, the system comprising:

beverage tubing, the beverage tubing comprising:

a first branch configured to couple with a first flushing fluid supply, the first branch comprising a first valve configured to control a flow of first flushing fluid from the first flushing fluid supply; and a second branch configured to couple with a beverage source, the second branch comprising a second valve configured to control a flow of beverage from the beverage source;

a dispenser coupled to the beverage tubing downstream from the first branch and the second branch, the dispenser configured to dispense the beverage to a user; and a controller operatively coupled to the first valve, the second valve, and the dispenser, the controller configured to:

open the first valve to fill the beverage tubing with the first flushing fluid;

close the first valve and open the second valve so that the beverage flows from the beverage source;

determine that the beverage has flowed to the dispenser based on a pressure of the beverage source, and/or a length of the beverage tubing between the beverage source and the dispenser to facilitate dispensing of the beverage through the dispenser; and responsive to completion of beverage dispensing, close the second valve and open the first valve to re-fill the beverage tubing with the first flushing fluid from the first flushing fluid supply.

2. The system of claim 1, wherein the first flushing fluid is water and/or carbon dioxide (CO2).

3. The system of claim 1, further comprising a third branch of the beverage tubing configured to couple with a second flushing fluid supply, the third branch comprising a third valve configured to control a flow of second flushing fluid from the second flushing fluid supply.

4. The system of claim 3, wherein the controller is operatively coupled to the first valve, the second valve, the dispenser, and the third valve, the controller configured to, responsive to completion of the beverage dispensing, close the second valve and open the first valve to re-fill the beverage tubing with the first flushing fluid from the first flushing fluid supply, then close the first valve and open the third valve to fill the beverage tubing with the second flushing fluid from the second flushing fluid supply.

5. The system of claim 4, wherein the first flushing fluid is water and the second flushing fluid is CO2.

6. The system of claim 1, wherein the dispenser is a trigger tap, and wherein the trigger tap is configured to release at least some of the first flushing fluid while the trigger tap is in a closed position.

7. The system of claim 6, wherein the first flushing fluid supply is pressurized.

8. The system of claim 1, further comprising:

a flow meter coupled to the beverage tubing downstream from the dispenser such that the beverage flowing through the beverage tubing passes the dispenser before contacting the flow meter;

wherein the controller is operatively coupled to the first valve, the second valve, and the dispenser, and the flow meter, the controller configured to:

open the first valve to fill the beverage tubing with the first flushing fluid;

close the first valve, and open the second valve so that the beverage flows from the beverage source, past the dispenser, to the flow meter;

determine that the beverage is flowing through the flow meter based on a pressure of the beverage source, and/or a length of the beverage tubing between the beverage source and the flow meter; and determine a flow rate for the beverage based on one or more output signals from the flow meter;

facilitate dispensing of the beverage through the dispenser; and responsive to completion of the beverage dispensing, close the second valve, and open the first valve, to re-fill the beverage tubing with the first flushing fluid from the first flushing fluid supply.

9. The system of claim 8, wherein the dispenser comprises a sensor configured to generate one or more output signals indicating that the beverage is being dispensed through the dispenser, wherein the controller is operatively coupled to the sensor, and wherein the controller is configured to determine an amount of the beverage dispensed through the dispenser based on the one or more output signals from the sensor, and/or the one or more output signals from the flow meter.

10. The system of claim 9, wherein the sensor comprises a button and/or a latch configured to indicate when a handle of the dispenser is moved from a closed position to an open position or from the open position to the closed position.

11. The system of claim 9, wherein the controller is configured to determine a cost of the beverage dispensed through the dispenser based on the amount of beverage dispensed through the dispenser.

12. The system of claim 1, further comprising:

a drain valve coupled to the beverage tubing and configured to control a flow of the first flushing fluid and/or the beverage to a drain;

wherein the controller is operatively coupled to the first valve, the second valve, the dispenser, and the drain valve, the controller configured to:

open the first valve and the drain valve to fill the beverage tubing with the first flushing fluid, and close the drain valve once the beverage tubing is filled with the first flushing fluid;

close the first valve, open the drain valve, and open the second valve so that the beverage flows from the beverage source, past the dispenser, to the drain;

close the drain valve to facilitate dispensing of the beverage through the dispenser; and responsive to completion of the beverage dispensing, close the second valve, open the first valve, and open the drain valve to re-fill the beverage tubing with the first flushing fluid from the first flushing fluid supply, and close the drain valve.

13. The system of claim 1, further comprising one or more additional parallel second branches of the beverage tubing configured to couple with one or more additional parallel second beverage sources, the one or more additional parallel second branches each comprising an additional valve configured to control a flow of beverage from a respective beverage source.

14. The system of claim 13, wherein the controller is configured to, responsive to completion of beverage dispensing from any of the one or more additional parallel second beverage sources, close the additional valve, and open the first valve, to re-fill the beverage tubing with the first flushing fluid from the first flushing fluid supply.

15. The system of claim 14, wherein the controller is configured to control flow from a respective beverage source based on user selection of the beverage source.

16. The system of claim 1, further comprising a user interface operatively coupled to the controller, the user interface configured to receive information from and provide information to the user.

17. The system of claim 16, wherein the information received from, or provided to, the user comprises:

a radio frequency identification (RFID) associated with the user;

user credit card information;

a beverage menu comprising one or more additional parallel beverages for selection by the user;

an instruction to begin pouring a given beverage once a flow rate for the given beverage has been determined;

a charge for an amount of the beverage dispensed; and/or a receipt for the charged amount.

18. The system of claim 1, wherein the first valve is an electric solenoid valve.

19. The system of claim 1, wherein the second valve is an electric motorized ball valve.

20. The system of claim 1, wherein the first branch comprises a one way check valve configured to prevent back flow to the first flushing fluid supply, and is coupled to the second branch by a three way tube tee.

21. The system of claim 20, wherein the second branch is coupled to the first branch by a three way tube tee so that the beverage and the first flushing fluid can both flow toward the dispenser.

22. The system of claim 1, wherein the dispenser is coupled to the beverage tubing by a three way tube tee, with a one way check valve along the beverage tubing on a downstream side of the three way tube tee.

23. The system of claim 1, further comprising a pump coupled to the beverage tubing downstream from the dispenser.

24. The system of claim 23, wherein the pump is operatively coupled to the controller, and wherein the pump is configured to be actuated if necessary by the controller to pump the first flushing fluid and/or the beverage through the beverage tubing.

25. The system of claim 1, wherein the beverage is beer, and the beverage source is a keg of the beer.

* * * * *